US012712619B2

(12) United States Patent
Li

(10) Patent No.: US 12,712,619 B2
(45) Date of Patent: Aug. 18, 2026

(54) PHASED ARRAY APPARATUS AND COMMUNICATION DEVICE

(71) Applicant: HUAWEI TECHNOLOGIES CO., LTD., Shenzhen (CN)

(72) Inventor: Zhi Li, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 347 days.

(21) Appl. No.: 18/472,044

(22) Filed: Sep. 21, 2023

(65) Prior Publication Data

US 2024/0014876 A1 Jan. 11, 2024

Related U.S. Application Data

(63) Continuation of application No. PCT/CN2021/083414, filed on Mar. 26, 2021.

(51) Int. Cl.
*H04B 7/06* (2006.01)

(52) U.S. Cl.
CPC .................................. *H04B 7/0682* (2013.01)

(58) Field of Classification Search
CPC ...... H04B 7/0682; H04B 1/0483; H04B 1/40; H04B 7/0617; H01Q 3/42
USPC .......................................................... 375/267
See application file for complete search history.

(56) References Cited

U.S. PATENT DOCUMENTS

2018/0252807 A1* 9/2018 Fox ....................... G01S 13/904
2023/0238701 A1* 7/2023 Cui ......................... H03F 3/195
343/860

FOREIGN PATENT DOCUMENTS

CN 109818596 A 5/2019
WO 2016179799 A1 11/2016

OTHER PUBLICATIONS

International Search Report and Written Opinion in International Appln. No. PCT/CN2021/083414, mailed on Dec. 13, 2021, 18 pages (with English translation).
Yang et al., "Local Oscillator Phase Shifting and Harmonic Mixing-Based High-Precision Phased Array for 5G Millimeter-Wave Communications," IEEE Transactions on Microwave Theory and Techniques, vol. 67, No. 7, Jul. 2019, 12 pages.
Ehyaie, "Novel Approaches to the Design of Phased Array Antennas," Thesis for the degree of Doctor of Philosophy, University of Michigan, School of Electrical Engineering, Jan. 2011, 153 pages.
Extended European Search Report in European Appln. No. 21932290.6, mailed on Feb. 19, 2024, 10 pages.

* cited by examiner

*Primary Examiner* — Fitwi Y Hailegiorgis
(74) *Attorney, Agent, or Firm* — Fish & Richardson P.C.

(57) ABSTRACT

This application provides a phased array apparatus and a communication device, and relates to the field of communication technologies. The phased array apparatus includes phased array channels coupled to antenna units in an antenna array. Each of the phased array channels is configured to transmit radio frequency signals of at least two frequency bands. Each of the phased array channels includes an intermediate frequency phase shifter configured to set a phase of an intermediate frequency signal corresponding to a radio frequency signal transmitted in the phased array channel.

20 Claims, 11 Drawing Sheets

PHASED ARRAY APPARATUS AND COMMUNICATION DEVICE

CROSS-REFERENCE TO RELATED APPLICATIONS

This application is a continuation of International Application No. PCT/CN2021/083414, filed on Mar. 26, 2021, the disclosure of which is hereby incorporated by reference in its entirety.

TECHNICAL FIELD

This application relates to the field of communication technologies, and in particular, to a phased array apparatus and a communication device.

BACKGROUND

A high-frequency millimeter wave has abundant spectrum resources and a high bandwidth, and therefore is widely applied to fields such as 5G communication, microwave backhaul, and indoor short-range communication. Because the high-frequency millimeter wave has a large space loss in a channel, a phased array technology is generally used to implement communication of the high-frequency millimeter wave. In addition, the high-frequency millimeter wave has a plurality of operating frequency bands such as 24.25 GHz to 29.5 GHz, 37.0 GHz to 43.5 GHz, and 57 GHz to 71 GHz. This requires that a communication device using the phased array technology needs to support communication on the plurality of frequency bands.

In a phased array architecture that supports a plurality of frequency bands in a solution of the conventional technology, phase shift of different phased array channels is implemented by performing radio frequency phase shift on a radio frequency signal. Because a radio frequency signal phase shifter is located in a radio frequency signal path, various factors, such as a noise coefficient, linearity, impedance matching, and a signal bandwidth, need to be considered. Therefore, design difficulty of a phased array is great, especially in a millimeter wave frequency band.

SUMMARY

This application provides a phased array apparatus and a communication device, to reduce design difficulty of a phased array.

To achieve the foregoing objective, the following technical solutions are used in this application.

According to a first aspect, a phased array apparatus is provided. The apparatus includes a plurality of phased array channels, the plurality of phased array channels are coupled to a plurality of antenna units in an antenna array, each phased array channel in the plurality of phased array channels is configured to transmit radio frequency signals of at least two frequency bands, the at least two frequency bands may include frequency bands of two or more different frequency ranges, and frequency ranges corresponding to the at least two frequency bands may partially overlap or may not overlap. Each phased array channel in the plurality of phased array channels includes an intermediate frequency phase shifter. The intermediate frequency phase shifter is configured to set a phase of an intermediate frequency signal corresponding to a radio frequency signal transmitted on the phased array channel. The radio frequency signal may be a radio frequency signal of the at least two frequency bands, and the radio frequency signal may be a receive signal or a transmit signal.

In the foregoing technical solution, the plurality of phased array channels are coupled to the plurality of antenna units, each phased array channel in the plurality of phased array channels includes the intermediate frequency phase shifter, and the intermediate frequency phase shifter is configured to set phases of intermediate frequency signals corresponding to radio frequency signals of at least two frequency bands that are transmitted on the phased array channel. That is, a phase shift function of the phased array channel for signals of different frequency bands is implemented by performing phase shift processing on intermediate frequency signals corresponding to radio frequency signals of different frequency bands. In this way, phase shift of different frequency bands may be implemented by using the intermediate frequency phase shifter, so that compared with conventional radio frequency phase shift, design difficulty of a phased array can be greatly reduced.

In a possible implementation of the first aspect, each phased array channel in the plurality of phased array channels further includes a local oscillator phase shifter, and the local oscillator phase shifter is configured to set a phase of a local oscillator signal transmitted on the phased array channel. Phases of signals of different frequency bands in a same phased array channel are related to phases of local oscillator signals transmitted on the phased array channel. The phases of the signals of different frequency bands transmitted on the phased array channel may also be changed by setting the phases of the local oscillator signals transmitted on the phased array channel. In the foregoing possible implementation, phase shift processing may be performed on local oscillator signals corresponding to radio frequency signals of different frequency bands in a same phased array channel by using a same local oscillator phase shifter. Therefore, phase shift for the signals of different frequency bands in the same phased array channel may be implemented by using both an intermediate frequency phase shifter and a local oscillator phase shifter included in the phased array channel. In this way, a stage quantity of the phase shifter in the phased array channel can be greatly reduced, thereby reducing an area and an insertion loss of the phased array apparatus, and further increasing a gain of a signal in the phased array channel.

In a possible implementation of the first aspect, the at least two frequency bands include a first frequency band and a second frequency band, each phased array channel in the plurality of phased array channels includes a first transmission channel corresponding to the first frequency band and a second transmission channel corresponding to the second frequency band, and the first transmission channel and the second transmission channel in a same phased array channel share the intermediate frequency phase shifter. In the foregoing possible implementation, the transmission channels corresponding to different frequency bands in the same phased array channel may share the same intermediate frequency phase shifter, so that phase shift processing may be performed on intermediate frequency signals corresponding to radio frequency signals of different frequency bands by using the intermediate frequency phase shifter, thereby further reducing an area of the phased array apparatus.

In a possible implementation of the first aspect, the first transmission channel and the second transmission channel in the same phased array channel share the local oscillator phase shifter. In the foregoing possible implementation, the transmission channels corresponding to different frequency bands in the same phased array channel may share the same local oscillator phase shifter, so that phase shift processing may be performed on local oscillator signals corresponding to radio frequency signals of different frequency bands by using the local oscillator phase shifter, thereby further reducing an area of the phased array apparatus while reducing a stage quantity of the phase shifter.

In a possible implementation of the first aspect, the intermediate frequency phase shifter includes a first intermediate frequency phase shifter and a second intermediate frequency phase shifter, the first transmission channel includes a first receive circuit, and the second transmission channel includes a second receive circuit. The first receive circuit and the second receive circuit share the first intermediate frequency phase shifter. In the foregoing possible implementation, receive circuits of different frequency bands in a same phased array channel may share the first intermediate frequency phase shifter, so that costs of the phased array apparatus can be reduced, and an area of the phased array apparatus can be further reduced.

In a possible implementation of the first aspect, the intermediate frequency phase shifter includes a second intermediate frequency phase shifter, the first transmission channel further includes a first transmit circuit, and the second transmission channel further includes a second transmit circuit. The first transmit circuit and the second transmit circuit share the second intermediate frequency phase shifter. In the foregoing possible implementation, transmit circuits of different frequency bands in a same phased array channel may share the second intermediate frequency phase shifter, so that costs of the phased array apparatus can be reduced, and an area of the phased array apparatus can be further reduced.

In a possible implementation of the first aspect, the first receive circuit, the first transmit circuit, the second receive circuit, and the second transmit circuit in the same phased array channel further share one local oscillator phase shifter. In the foregoing possible implementation, transmit circuits and receive circuits of different frequency bands in a same phased array channel may share one local oscillator phase shifter, so that an area of the phased array apparatus can be further reduced.

In a possible implementation of the first aspect, the first receive circuit and the second receive circuit each further include a low noise amplifier LNA and a down-converter that are coupled in sequence, and the first transmit circuit and the second transmit circuit each further include a power amplifier PA and an up-converter that are coupled in sequence. In the foregoing possible implementations, a possible specific structure of a receive circuit and a possible specific structure of a transmit circuit are provided.

In a possible implementation of the first aspect, the apparatus further includes a power dividing/combining network. The power dividing/combining network includes a first power dividing/combining network and a second power dividing/combining network. Both the first receive circuit and the second receive circuit in the plurality of phased array channels are coupled to the first power dividing/combining network, and both the first transmit circuit and the second transmit circuit in the plurality of phased array channels are coupled to the second power dividing/combining network. In the foregoing possible implementation, receive circuits of different frequency bands in the plurality of phased array channels may share the first power dividing/combining network, and transmit circuits of different frequency bands in the plurality of phased array channels may share the second power dividing/combining network, so that an area of the phased array apparatus can be further reduced.

In a possible implementation of the first aspect, the apparatus further includes a signal processing circuit. The signal processing circuit includes a receive signal processing circuit and a transmit signal processing circuit, the first power dividing/combining network is coupled to the receive signal processing circuit, and the second power dividing/combining network is coupled to the transmit signal processing circuit. In the foregoing possible implementation, receive circuits of different frequency bands in the plurality of phased array channels may share the receive signal processing circuit, and transmit circuits of different frequency bands in the plurality of phased array channels may share the transmit signal processing circuit, so that an area of the phased array apparatus can be further reduced.

In a possible implementation of the first aspect, the at least two frequency bands include a first frequency band and a second frequency band, each phased array channel in the plurality of phased array channels includes a first transmission channel corresponding to the first frequency band and a second transmission channel corresponding to the second frequency band, and each transmission channel of the first transmission channel and the second transmission channel in a same phased array channel includes an independent intermediate frequency phase shifter. In the foregoing possible implementation, phase shift may be performed on the transmission channels corresponding to different frequency bands in the same phased array channel by using different intermediate frequency phase shifters, that is, phase shift processing is performed on intermediate frequency signals corresponding to radio frequency signals of different frequency bands by using different intermediate frequency phase shifters. Therefore, compared with conventional radio frequency phase shift, design difficulty of a phased array can be greatly reduced, and flexibility of performing phase shift on signals of different frequency bands by the phased array apparatus can be improved simultaneously.

In a possible implementation of the first aspect, each transmission channel of the first transmission channel and the second transmission channel in the same phased array channel includes an independent local oscillator phase shifter. In the foregoing possible implementation, local oscillator signals transmitted on the transmission channels corresponding to the different frequency bands in the same phased array channel may be phase-shifted by using different local oscillator phase shifters, that is, phase shift processing is performed on the local oscillator signals of the different frequency bands by using different local oscillator phase shifters, so that flexibility of performing phase shift on the signals of the different frequency bands by the phased array apparatus can be improved.

In a possible implementation of the first aspect, the intermediate frequency phase shifter includes a first intermediate frequency phase shifter and a second intermediate frequency phase shifter; the first transmission channel includes a first receive circuit, and the first receive circuit includes the first intermediate frequency phase shifter; and the second transmission channel includes a second receive circuit, and the second receive circuit includes the second intermediate frequency phase shifter. In the foregoing possible implementation, receive circuits corresponding to different frequency bands in the same phased array channel each may include one intermediate frequency phase shifter, that is, different intermediate frequency phase shifters are used to perform phase shift processing on intermediate frequency signals in receive directions of different frequency bands, so that flexibility of performing phase shift on signals of different frequency bands by the phased array apparatus can be improved.

In a possible implementation of the first aspect, the intermediate frequency phase shifter further includes a first intermediate frequency phase shifter and a second intermediate frequency phase shifter; the first transmission channel further includes a first transmit circuit, and the first transmit circuit includes the first intermediate frequency phase shifter; and the second transmission channel further includes a second transmit circuit, and the second transmit circuit includes the second intermediate frequency phase shifter. In the foregoing possible implementation, transmit circuits corresponding to different frequency bands in the same phased array channel each may include one intermediate frequency phase shifter, that is, different intermediate frequency phase shifters are used to perform phase shift processing on intermediate frequency signals in transmit directions of different frequency bands, so that flexibility of performing phase shift on signals of different frequency bands by the phased array apparatus can be improved.

In a possible implementation of the first aspect, the local oscillator phase shifter includes a first local oscillator phase shifter and a second local oscillator phase shifter, the first receive circuit and the first transmit circuit in a same phased array channel share the first local oscillator phase shifter, and the second receive circuit and the second transmit circuit in the same phased array channel share the second local oscillator phase shifter. In the foregoing possible implementation, local oscillator signals of different frequency bands in the same phased array channel are phase-shifted by using different local oscillator phase shifters, and local oscillator signals in a receive direction and a transmit direction on a transmission channel corresponding to a same frequency band are phase-shifted by using a same local oscillator phase shifter. Therefore, flexibility of performing phase shift on signals of different frequency bands can be improved while an area of the phased array apparatus is reduced.

In a possible implementation of the first aspect, the first receive circuit and the second receive circuit each further include a low noise amplifier LNA, a down-converter, and a first switch that are coupled in sequence, and the first transmit circuit and the second transmit circuit each further include a power amplifier PA, an up-converter, and a second switch that are coupled in sequence. In the foregoing possible implementations, a possible specific structure of a receive circuit and a possible specific structure of a transmit circuit are provided.

In a possible implementation of the first aspect, the apparatus further includes a power dividing/combining network. The power dividing/combining network includes a first power dividing/combining network and a second power dividing/combining network. Both the first receive circuit and the first transmit circuit in the plurality of phased array channels are coupled to the first power dividing/combining network, and both the second receive circuit and the second transmit circuit in the plurality of phased array channels are coupled to the second power dividing/combining network. In the foregoing possible implementation, the receive circuit and the transmit circuit of a same frequency band on the plurality of phased array channels may share a same power dividing/combining network, so that flexibility of performing power dividing processing or combining processing on signals of different frequency bands can be improved.

In a possible implementation of the first aspect, the apparatus further includes a signal processing circuit. The signal processing circuit includes a first signal processing circuit coupled to the first power dividing/combining network and a second signal processing circuit coupled to the second power dividing/combining network; and the first signal processing circuit includes a first send signal processing circuit and a first receive signal processing circuit, and the second signal processing circuit includes a second send signal processing circuit and a second receive signal processing circuit. In the foregoing possible implementation, the receive signal and the transmit signal of the same frequency band are processed by using different processing circuits, so that flexibility of performing signal processing on different signals of the same frequency band can be improved.

In a possible implementation of the first aspect, the apparatus further includes a plurality of switching switches. The plurality of switching switches are coupled between the plurality of antenna units and the plurality of phased array channels in a one-to-one correspondence. In the foregoing possible implementation, the radio frequency signals transmitted on the plurality of phased array channels may be switched by using the plurality of switching switches, so that the apparatus can support transmission of radio frequency signals of different frequency bands.

In a possible implementation of the first aspect, the at least two frequency bands are millimeter-wave bands. In the foregoing possible implementation, when the at least two frequency bands are millimeter-wave bands, the phased array apparatus may support transmission of radio frequency signals of at least two millimeter-wave bands.

In a possible implementation of the first aspect, the local oscillator phase shifter includes: a local oscillator signal generator, configured to generate a first in-phase local oscillator signal and a first quadrature local oscillator signal, where the first in-phase local oscillator signal and the first quadrature local oscillator signal are voltage signals; a first transconductance stage and a second transconductance stage, configured to respectively convert the first in-phase local oscillator signal and the first quadrature local oscillator signal into a second in-phase local oscillator signal and a second quadrature local oscillator signal, where the second in-phase local oscillator signal and the second quadrature local oscillator signal are current signals; and a first tunable current source and a second tunable current source, configured to respectively adjust the second in-phase local oscillator signal and the second quadrature local oscillator signal, to adjust a phase of a local oscillator signal obtained through combining the second in-phase local oscillator signal and the second quadrature local oscillator signal.

In a possible implementation of the first aspect, the first transconductance stage includes a first MOS transistor and a second MOS transistor, a gate of the first MOS transistor and a gate of the second MOS transistor are configured to receive the first in-phase local oscillator signal, a source of the first MOS transistor and a source of the second MOS transistor are both coupled to the first tunable current source, a drain of the first MOS transistor and a drain of the second MOS transistor are configured to output the second in-phase local oscillator signal; the second transconductance stage includes a third MOS transistor and a fourth MOS transistor, a gate of the third MOS transistor and a gate of the fourth MOS transistor are configured to receive the first quadrature local oscillator signal, a source of the third MOS transistor and a source of the fourth MOS transistor are both coupled to the second tunable current source, and a drain of the third MOS transistor and a drain of the fourth MOS transistor are coupled and are configured to output the second quadrature local oscillator signal.

In a possible implementation of the first aspect, the local oscillator phase shifter further includes a selection circuit. The selection circuit includes: a first selection circuit configured to provide the local oscillator signal for a first branch, and a second selection circuit configured to provide the local oscillator signal for a second branch. Optionally, each selection circuit of the first selection circuit and the second selection circuit includes two MOS transistors, gates of the two MOS transistors each are configured to receive a switch signal, drains of the two MOS transistors are used as output ends, a source of one MOS transistor of the two MOS transistors is coupled to an output end (for example, a drain coupling point of the first MOS transistor and the second MOS transistor) of the first transconductance stage, and a source of the other MOS transistor is coupled to an output end (for example, a drain coupling point of the third MOS transistor and the fourth MOS transistor) of the second transconductance stage.

In a possible implementation of the first aspect, the foregoing first branch is a transmit circuit, and the second branch is a receive circuit. For example, the transmit circuit and the receive circuit are respectively a first transmit circuit and a first receive circuit, or the transmit circuit and the receive circuit are respectively a second transmit circuit and a second receive circuit.

In a possible implementation of the first aspect, the local oscillator signal obtained through combining the second in-phase local oscillator signal and the second quadrature local oscillator signal is a current signal, and the local oscillator phase shifter further includes a conversion circuit, configured to convert the local oscillator signal into a voltage signal.

According to a second aspect, a phased array apparatus is provided. The apparatus includes a plurality of phased array channels, the plurality of phased array channels are coupled to a plurality of antenna units in an antenna array, each phased array channel in the plurality of phased array channels is configured to transmit radio frequency signals on at least two frequency bands, the at least two frequency bands may include frequency bands of two or more different frequency ranges, and frequency ranges corresponding to the at least two frequency bands may partially overlap or may not overlap. Each of the plurality of phased array channels includes a local oscillator phase shifter. The local oscillator phase shifter is configured to set a phase of a local oscillator signal corresponding to a radio frequency signal transmitted on the phased array channel. The radio frequency signal may be radio frequency signals of the at least two frequency bands, and the radio frequency signal may be a receive signal or a transmit signal.

In the foregoing technical solution, the plurality of phased array channels are coupled to the plurality of antenna units, each phased array channel in the plurality of phased array channels includes the intermediate frequency phase shifter, and the intermediate frequency phase shifter is configured to set phases of intermediate frequency signals corresponding to radio frequency signals of at least two frequency bands that are transmitted on the phased array channel. That is, a phase shift function of the phased array channel for signals of different frequency bands is implemented by performing phase shift processing on intermediate frequency signals corresponding to radio frequency signals of different frequency bands. In this way, phase shift of different frequency bands may be implemented by using the same intermediate frequency phase shifter, thereby reducing costs of the phased array apparatus.

In a possible implementation of the second aspect, each phased array channel in the plurality of phased array channels further includes an intermediate frequency phase shifter. The intermediate frequency phase shifter is configured to set a phase of an intermediate frequency signal corresponding to a radio frequency signal transmitted on the phased array channel. It should be noted that for specific descriptions of the intermediate frequency phase shifter, refer to related descriptions of the intermediate frequency phase shifter provided in the first aspect or any possible implementation of the first aspect. Details are not described herein again in this application. In the foregoing possible implementation, phase shift processing may be performed on intermediate frequency signals corresponding to radio frequency signals of different frequency bands in a same phased array channel by using a same intermediate frequency phase shifter. Therefore, phase shift of signals of different frequency bands in the same phased array channel may be implemented by using both the intermediate frequency phase shifter and the local oscillator phase shifter included in the phased array channel. In this way, a stage quantity of phase shifters in the phased array channel can be greatly reduced, thereby reducing an area and an insertion loss of the phased array apparatus, and further increasing a gain of a signal in the phased array channel.

It should be noted that for specific descriptions of the local oscillator phase shifter or the intermediate frequency phase shifter in the second aspect or any possible implementation of the second aspect, refer to related descriptions of the local oscillator phase shifter or the intermediate frequency phase shifter provided in the foregoing first aspect or any possible implementation of the first aspect. Details are not described herein again in this application. In addition, descriptions of the power dividing/combining network and/or the signal processing circuit provided in any possible implementation of the first aspect may also be applicable to the second aspect or possible implementations of the second aspect. Details are not described herein again in this application.

According to a third aspect, a chip module is provided, including a chip and a package substrate. The chip is fastened to the package substrate, the chip includes any phased array apparatus provided in the first aspect or any possible implementation of the first aspect, or the chip includes any phased array apparatus provided in the second aspect or any possible implementation of the second aspect, the package substrate includes an antenna array having a plurality of antenna units, and the plurality of antenna units are coupled to a plurality of phased array channels in the phased array apparatus.

According to a fourth aspect, a communication device is provided. The communication device includes the phased array apparatus provided in the first aspect or any possible implementation of the first aspect, or the communication device includes the phased array apparatus provided in the second aspect or any two possible implementations of the second aspect.

It may be understood that any chip module and communication device provided above each include all content of the phased array apparatus provided above. Therefore, for beneficial effects that can be achieved by the chip module and the communication device, refer to the beneficial effects of the phased array apparatus provided above. Details are not described herein again.

DESCRIPTION OF EMBODIMENTS

Figure 1:
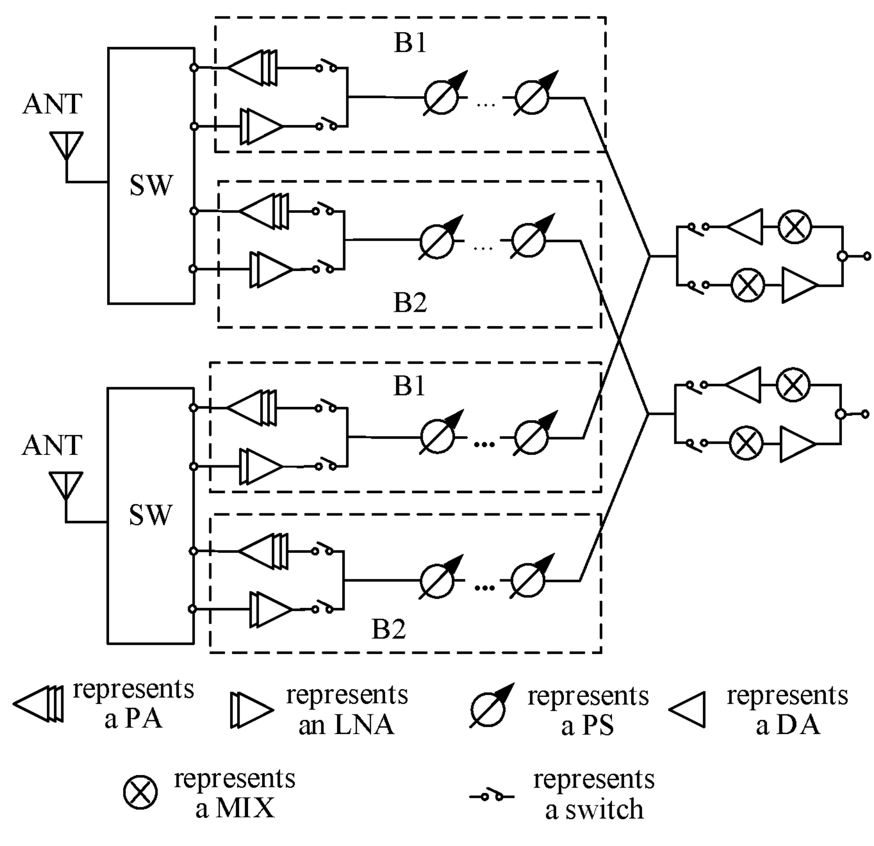
FIG. 1 is a schematic diagram of a phased array architecture.

The making and use of embodiments are discussed in detail below. It should be appreciated, however, that many applicable inventive concepts provided in this application may be implemented in a plurality of specific environments. The specific embodiments discussed are merely illustrative of specific ways to implement and use this description and this technology, and do not limit the scope of this application.

Unless otherwise defined, all technical terms used herein have the same meaning as those commonly known to a person of ordinary skill in the art.

The circuits or other components may be described as or referred to as "configured to" perform one or more tasks. In this case, the term "configured to" is used for implying a structure by indicating that a circuit/component includes a structure (for example, a circuit system) that performs one or more tasks during operation. Therefore, even when a specified circuit/component is currently not operable (for example, not opened), the circuit/component may also be referred to as being configured to perform the task. Circuits/components used in conjunction with the "configured to" phrase include hardware, for example, a circuit for performing an operation.

The following describes the technical solutions in embodiments of this application with reference to the accompanying drawings in embodiments of this application. In this application, "at least one" means one or more, and "a plurality of" means two or more. "And/Or" describes an association relationship for describing associated objects and represents that three relationships may exist. For example, A and/or B may represent the following cases: Only A exists, both A and B exist, and only B exists, where A and B may be singular or plural. A character "/" generally indicates an "or" relationship between associated objects. "At least one of the following items (pieces)" or a similar expression thereof refers to any combination of these items, including one item (piece) or any combination of a plurality of items (pieces). For example, at least one item (piece) of a, b, or c may represent: a, b, c, a and b, a and c, b and c, or a, b, and c, where a, b, and c may be singular or plural.

In embodiments of this application, words such as "first" and "second" are used to distinguish between objects with similar names or functions or effects. A person skilled in the art may understand that the words such as "first" and "second" do not limit a quantity and an execution sequence. The term "coupling" is used for representing an electrical connection, including a direct connection through a wire or a connection end or an indirect connection through another device. Therefore, "coupling" should be considered as a generalized electronic communication connection.

It should be noted that the term "an example" or "for example" in this application means "used as an example, an illustration, or a description. Any embodiment or design solution described as "example" or "for example" in this application should not be explained as being more preferred or having more advantages than another embodiment or design solution. Exactly, use of the word "example", "for example", or the like is intended to present a related concept in a specific manner.

The technical solutions provided in this application may be applied to communication of a high frequency millimeter wave. The high frequency millimeter wave has abundant spectrum resources and a high bandwidth, is applicable to an application scenario with a large bandwidth and a large data rate, and is widely applied in fields such as 5G communication, microwave backhaul, and indoor short-range communication.

A space loss of the high frequency millimeter wave in a channel is large, and a transmission characteristic is closer to direct radiation. Because more concentrated energy transmission can be implemented by using a phased array technology, and a signal has better directivity, the phased array technology is generally used to implement the communication of the high frequency millimeter wave.

The high frequency millimeter wave has a plurality of operating frequency bands such as 24.25 GHz to 29.5 GHz, 37.0 GHz to 43.5 GHz, and 57 GHz to 71 GHz. Therefore, in an application scenario of millimeter wave multi-frequency band communication, a communication device that uses the phased array technology needs to support communication on the plurality of frequency bands.

Optionally, the phased array technology may also be applied to another frequency band, for example, a lower frequency band or a higher frequency band of a millimeter-wave band.

For example, FIG. 1 shows an architecture using a multi-frequency phased array. The multi-frequency phased array includes two phased array channels, and each phased array channel supports receiving and sending of signals of two frequency bands (namely, B1 and B2). Each phased array channel includes an antenna (ANT), a switching switch (SW), and front-end circuits and phase shifters (PS) of two frequency bands that are separately coupled to the switching switch SW in sequence. PSs of a same frequency band in different phased array channels are coupled through a power dividing/combining network, and are connected to frequency mixing and amplification circuits of respective frequency bands after being coupled. The front-end circuit in FIG. 1 includes a power amplifier (PA) and a switch that are coupled in sequence, and a low noise amplifier (LNA) and a switch that are coupled in sequence. The frequency mixing and amplification circuit includes a switch, a frequency mixer (MIX), and a drive amplifier (DA) that are coupled in sequence.

Figure 2:
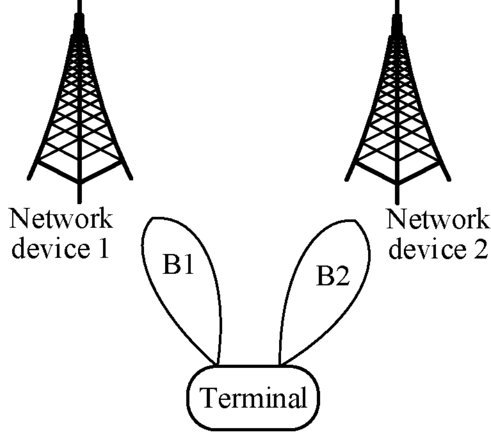
FIG. 2 is a schematic diagram in which a terminal supports millimeter wave communication on two frequency bands according to an embodiment of this application.

As shown in FIG. 2, for example, the foregoing communication device that uses a phased array is a terminal and supports millimeter wave communication of two frequency bands (band, B). The two frequency bands may be represented as B1 and B2. The terminal may use B1 to communicate with a network device 1, and may use B2 to communicate with a network device 2. The network device 1 and the network device 2 may be located in different directions of the terminal.

In this application, the communication device may be deployed on land, including indoor, outdoor, handheld, or in-vehicle devices. Alternatively, the communication device may be deployed on water (for example, on a ship), or may be deployed in the air (for example, on an airplane, a balloon, or a satellite). For example, the communication device may be a terminal, a base station, or the like. For example, the terminal includes but is not limited to: a mobile phone, a tablet computer, a notebook computer, a palmtop computer, a mobile Internet device (MID), a wearable device (for example, a smartwatch, a smart band, or a pedometer), an in-vehicle device (for example, a car, a bicycle, an electric vehicle, an airplane, a ship, a train, or a high-speed railway), a virtual reality (VR) device, an augmented reality (AR) device, a terminal in industrial control, a smart home device (for example, a refrigerator, a television, an air conditioner, or an electric meter), a smart robot, a workshop device, a terminal in unmanned driving (self-driving), a terminal in remote surgery (remote medical surgery), a terminal in a smart grid, a terminal in transportation safety, a terminal in a smart city, a terminal in a smart home, a flight device (for example, a smart robot, a hot air balloon, an unmanned aerial vehicle, or an airplane), or the like.

Figure 3:
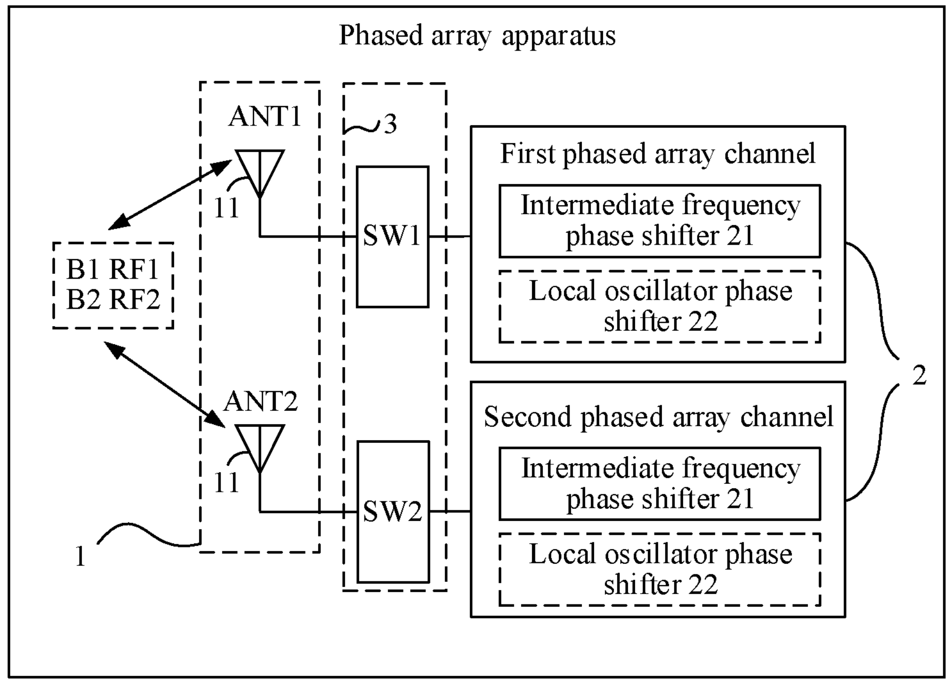
FIG. 3 is a schematic diagram of a structure of a first phased array apparatus according to an embodiment of this application.

FIG. 3 is a schematic diagram of a structure of a phased array apparatus according to an embodiment of this application. The phased array apparatus may be a communication device, or may be a module used in a communication device. As shown in FIG. 3, the phased array apparatus may include a plurality of phased array channels 2 coupled to an antenna array 1.

The antenna array 1 includes a plurality of antenna units 11, and each antenna unit 11 in the plurality of antenna units 11 is configured to transmit radio frequency signals of at least two frequency bands. The plurality of antenna units 11 may include two or more antenna units 11, and at least two frequency bands corresponding to different antenna units 11 are consistent. In addition, the at least two frequency bands may include two or more frequency bands with different frequency ranges, and frequency ranges corresponding to the at least two frequency bands may partially overlap, or may not overlap. Optionally, the at least two frequency bands may include a first frequency band and a second frequency band, and the first frequency band and the second frequency band may be millimeter-wave bands.

Optionally, in a physical implementation, an antenna unit configured to transmit radio frequency signals of at least two frequency bands may be a multi-frequency radiation antenna having at least two corresponding frequency bands, and the antenna unit may include a single-frequency radiation antenna having frequency bands respectively corresponding to the at least two frequency bands.

The plurality of phased array channels 2 are coupled to the plurality of antenna units 11. For example, each phased array channel 2 in the plurality of phased array channels 2 is coupled to one antenna unit 11, so that each phased array channel 2 may be configured to transmit radio frequency signals that are of at least two frequency bands and are transmitted by the corresponding antenna unit 11. Each phased array channel 2 in the plurality of phased array channels 2 includes an intermediate frequency phase shifter (PS) 21, and the intermediate frequency phase shifter 21 is configured to set a phase of an intermediate frequency (IF) signal corresponding to a radio frequency signal transmitted on the phased array channel 2. The plurality of phased array channels 2 may include two or more phased array channels 2, a quantity of the plurality of phased array channels 2 is the same as a quantity of the plurality of antenna units 11, and one phased array channel 2 is correspondingly coupled to one antenna unit 11. In addition, radio frequency signals transmitted on each phased array channel 2 may be the foregoing radio frequency signals of the at least two frequency bands, and the radio frequency signal may be a receive signal or a transmit signal. When the radio frequency signal is a receive signal, the intermediate frequency signal may be an intermediate frequency signal obtained after down-conversion processing is performed on the radio frequency signal; or when the radio frequency signal is a transmit signal, the radio frequency signal may be a radio frequency signal obtained after up-conversion processing is performed on the intermediate frequency signal.

In addition, the phased array apparatus may further include a plurality of switching switches (SW) 3. The plurality of switching switches 3 are in a one-to-one correspondence with the plurality of phased array channels 2. Each phased array channel 2 in the plurality of phased array channels 2 is coupled to one antenna unit 11 through one switching switch 3, that is, one switching switch 3 is coupled between one antenna unit 11 and one phased array channel 2. A switching switch 3 corresponding to each phased array channel 2 may be configured to switch radio frequency signals of at least two frequency bands transmitted on the phased array channel 2. For example, the at least two frequency bands include the first frequency band and the second frequency band, and the switching switch 3 may be configured to switch radio frequency signals of the first frequency band or radio frequency signals of the second frequency band transmitted on the phased array channel 2.

It should be noted that, in FIG. 3, an example in which the plurality of antenna units 11 include two antenna units and are respectively represented as an ANT1 and an ANT2, radio frequency signals of at least two frequency bands are respectively represented as a B1 RF1 and a B2 RF2, the plurality of phased array channels 2 include a first phased array channel and a second phased array channel, and the plurality of switching switches 3 include two switching switches and are respectively represented as an SW1 and an SW2 is used for description.

In the phased array apparatus provided in this application, the plurality of phased array channels 2 are coupled to the plurality of antenna units 11, each phased array channel 2 in the plurality of phased array channels 2 includes the intermediate frequency phase shifter 21, and the intermediate frequency phase shifter 21 is configured to set phases of intermediate frequency signals corresponding to the radio frequency signals of the at least two frequency bands that are transmitted on the phased array channel 2. That is, a phase shift function of the phased array channel 2 for signals of different frequency bands is implemented by performing phase shift processing on intermediate frequency signals corresponding to radio frequency signals of different frequency bands. In this way, phase shift of different frequency bands may be implemented by using the intermediate frequency phase shifter 21, so that compared with conventional radio frequency phase shift, design difficulty of a phased array can be greatly reduced.

Optionally, as shown in FIG. 3, each phased array channel 2 in the plurality of phased array channels 2 may further include a local oscillator phase shifter 22, and the local oscillator phase shifter 22 is configured to set a phase of a local oscillator signal transmitted on the phased array channel 2.

When the radio frequency signal transmitted on the phased array channel 2 is a receive signal, an intermediate frequency signal corresponding to the radio frequency signal may be obtained after down-conversion processing is performed on the radio frequency signal and the local oscillator signal; or when the radio frequency signal transmitted on the phased array channel 2 is a transmit signal, the radio frequency signal may be obtained after up-conversion processing is performed on an intermediate frequency signal corresponding to the radio frequency signal and the local oscillator signal. Therefore, phases of signals of different frequency bands in a same phased array channel are related to phases of local oscillator signals transmitted on the phased array channel. Therefore, the phases of the signals of different frequency bands transmitted on the phased array channel may also be changed by setting the phases of the local oscillator signals transmitted on the phased array channel.

In addition, phase shift processing may be performed on local oscillator signals corresponding to radio frequency signals of different frequency bands in a same phased array channel 2 by using a same local oscillator phase shifter 22. Phase shift of the signals of different frequency bands in the same phased array channel 2 may be implemented by using the intermediate frequency phase shifter 21 and the local oscillator phase shifter 22 included in the phased array channel 2. In this way, a stage quantity of the phase shifters in the phased array channel 2 can be greatly reduced, thereby reducing an area and an insertion loss of the phased array apparatus, and further increasing a gain of a signal in the phased array channel.

Further, in each phased array channel in the plurality of phased array channels 2, phase shift of at least two frequency bands transmitted on the phased array channel may be implemented in the following two manners. In a first manner, the at least two frequency bands may implement phase shift of the signals by using a shared intermediate frequency phase shifter 21, or an intermediate frequency phase shifter 21 and a local oscillator phase shifter 22. In a second manner, each frequency band in the at least two frequency bands separately uses a respective intermediate frequency phase shifter 21, or separately uses a respective intermediate frequency phase shifter 21 and a local oscillator phase shifter 22 to implement phase shift of the signals. For ease of description, the following separately describes the foregoing two manners by using an example in which the at least two frequency bands include a first frequency band and a second frequency band, and each phased array channel 2 in the plurality of phased array channels 2 includes a first transmission channel CH1 corresponding to the first frequency band and a second transmission channel CH2 corresponding to the second frequency band.

In a first manner, the first transmission channel CH1 and the second transmission channel CH2 in a same phased array channel share the intermediate frequency phase shifter 21 in the phased array channel.

Figure 4:
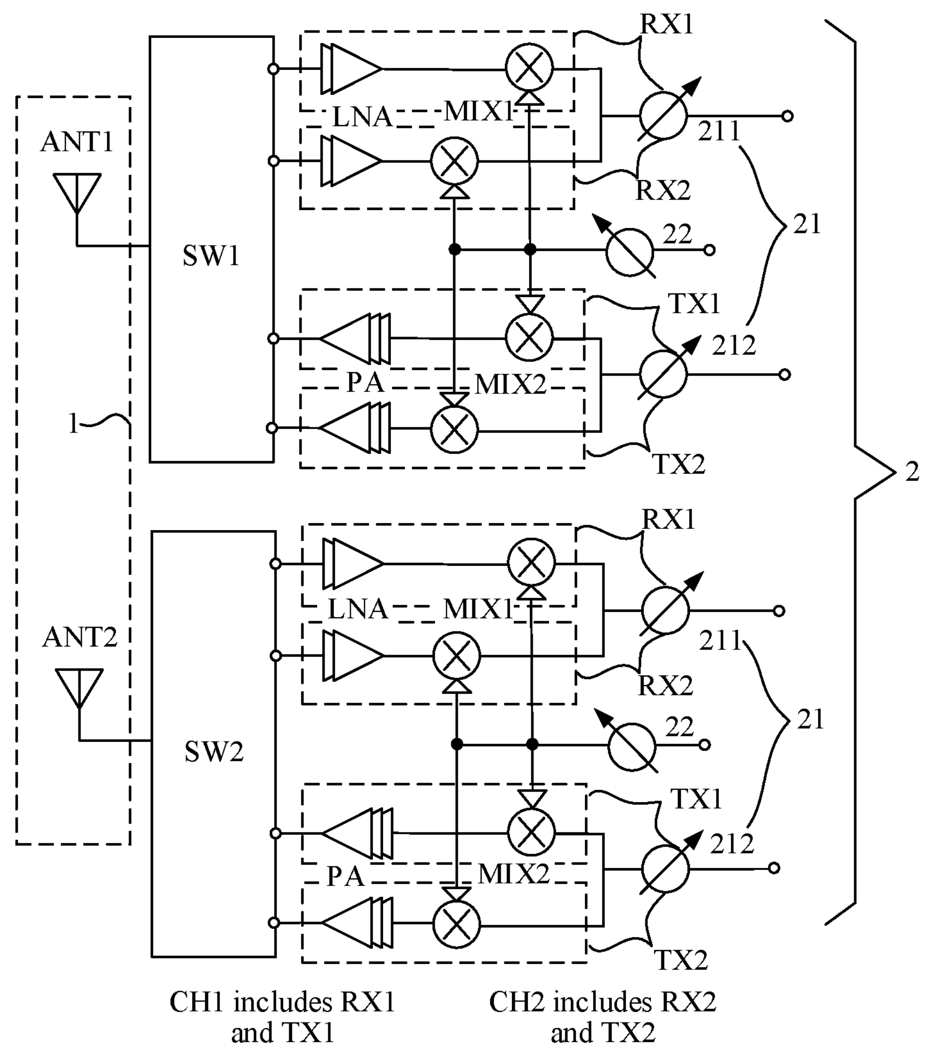
FIG. 4 is a schematic diagram of a structure of a second phased array apparatus according to an embodiment of this application.

In a possible embodiment, as shown in FIG. 4, the intermediate frequency phase shifter 21 includes a first intermediate frequency phase shifter 211 and a second intermediate frequency phase shifter 212. The first transmission channel CH1 further includes a first receive circuit RX1 and a first transmit circuit TX1, and the second transmission channel CH2 further includes a second receive circuit RX2 and a second transmit circuit TX2. The first receive circuit RX1 and the second receive circuit RX2 share the first intermediate frequency phase shifter 211, and the first transmit circuit TX1 and the second transmit circuit TX2 share the second intermediate frequency phase shifter 212.

Specifically, for phase shift of receive signals of the first frequency band and the second frequency band, the first receive circuit RX1 may be configured to convert a receive radio frequency signal of the first frequency band into a first intermediate frequency signal through down-conversion processing, and the second receive circuit RX1 may be configured to convert a receive radio frequency signal of the second frequency band into a second intermediate frequency signal through down-conversion processing. The first intermediate frequency phase shifter 211 may be configured to set a phase of the first intermediate frequency signal to implement phase shift of the receive signal of the first frequency band, or set a phase of the second intermediate frequency signal to implement phase shift of the receive signal of the second frequency band. For phase shift of transmit signals of the first frequency band and the second frequency band, the first intermediate frequency phase shifter 211 may be configured to set a phase of the first intermediate frequency signal, or set a phase of the second intermediate frequency signal; and then, the first transmit circuit TX1 may be configured to up-convert a phase-set first intermediate frequency signal into a radio frequency signal of the first frequency band, so that phase shift of a transmit signal of the first frequency band is implemented. The second transmit circuit TX2 may be configured to up-convert a phase-set second intermediate frequency signal into a radio frequency signal of the second frequency band, and send the radio frequency signal of the second frequency band, so that phase shift of a transmit signal of the second frequency band is implemented.

Correspondingly, as shown in FIG. 4, the first transmission channel CH1 and the second transmission channel CH2 in the same phased array channel may also share one local oscillator phase shifter 22. When the first transmission channel CH1 includes the first receive circuit RX1 and the first transmit circuit TX1, and the second transmission channel CH2 includes the second receive circuit RX2 and the second transmit circuit TX2, the first receive circuit RX1, the first transmit circuit TX1, the second receive circuit RX2, and the second transmit circuit TX2 in the same phased array channel may share one local oscillator phase shifter 22.

Specifically, for the first frequency band, the local oscillator phase shifter 22 may be configured to set a phase of a first local oscillator signal. In this way, the first receive circuit RX1 may perform down-conversion processing on the radio frequency signal of the first frequency band by using a phase-set first local oscillator signal, to change a phase of the first intermediate frequency signal obtained through down-conversion processing. Then, the first intermediate frequency phase shifter 211 performs phase shift processing on the first intermediate frequency signal, in other words, phase shift of the receive signal of the first frequency band is implemented. Similarly, the first transmit circuit TX1 may perform up-conversion processing by using the phase-set first local oscillator signal and the first intermediate frequency signal output by the second intermediate frequency phase shifter 212 through phase shift, to obtain a radio frequency signal of the first frequency band, in other words, implement phase shift of a transmit signal of the first frequency band.

For the second frequency band, the local oscillator phase shifter 22 may be configured to set a phase of a second local oscillator signal. In this way, the second receive circuit RX2 may perform down-conversion processing on the radio frequency signal of the second frequency band by using a phase-set second local oscillator signal, to change a phase of the second intermediate frequency signal obtained through down-conversion processing. Then, the first intermediate frequency phase shifter 211 performs phase shift processing on the second intermediate frequency signal, in other words, phase shift of the receive signal of the second frequency band is implemented. Similarly, the second transmit circuit TX2 may perform up-conversion processing by using the phase-set second local oscillator signal and the second intermediate frequency signal output by the second intermediate frequency phase shifter 212 through phase shift, to obtain a radio frequency signal of the second frequency band, in other words, phase shift of a transmit signal of the second frequency band is implemented.

In an example, as shown in FIG. 4, the first receive circuit RX1 and the second receive circuit RX2 may further include a low noise amplifier (LNA) and a down-converter that are coupled in sequence, and the first transmit circuit and the second transmit circuit may further include a power amplifier (PA) and an up-converter that are coupled in sequence. The up-converter may be an up mixer (MIX), and the down-converter may be a down mixer. In FIG. 4, an example in which MIX1 represents the down mixer and MIX2 represents the up mixer is used for description.

Optionally, when the at least two frequency bands further include a third frequency band, each phased array channel 2 in the plurality of phased array channels 2 may further include a third transmission channel CH3 corresponding to the third frequency band, the third transmission channel 3 may include a third receive circuit RX3 and a third transmit circuit TX3, and the third receive circuit RX3 and the third transmit circuit TX3 in a same phased array channel may also share an intermediate frequency phase shifter 21 and a local oscillator phase shifter 22 in the phased array channel. A specific sharing manner is consistent with a manner for the first transmission channel CH1 and the second transmission channel CH2, and details are not described herein again in this embodiment of this application.

In the foregoing first manner, each phased array channel 2 in the plurality of phased array channels 2 may implement complete phase shift of the receive signal of the first frequency band or the second frequency band by using the shared first intermediate frequency phase shifter 211 and the shared local oscillator phase shifter 22, and implement complete phase shift of the transmit signal of the first frequency band or the second frequency band by using the shared second intermediate frequency phase shifter 212 and the shared local oscillator phase shifter 22. In this way, a stage quantity of phase shifters can be greatly reduced, thereby reducing an insertion loss and increasing a signal gain in the phased array channel. In addition, phase shift of different frequency bands is implemented by sharing the intermediate frequency phase shifter 211 and the local oscillator phase shifter 22, which may further reduce an area of the phased array apparatus.

In a second manner, each transmission channel of the first transmission channel CH1 and the second transmission channel CH2 in a same phased array channel includes an independent intermediate frequency phase shifter 21. For ease of distinguishing, herein, an intermediate frequency phase shifter 21 on the first transmission channel CH1 is represented as a first intermediate frequency phase shifter 21*a*, and an intermediate frequency phase shifter 21 on the second transmission channel CH2 is represented as a second intermediate frequency phase shifter 21*b*.

Figure 5:
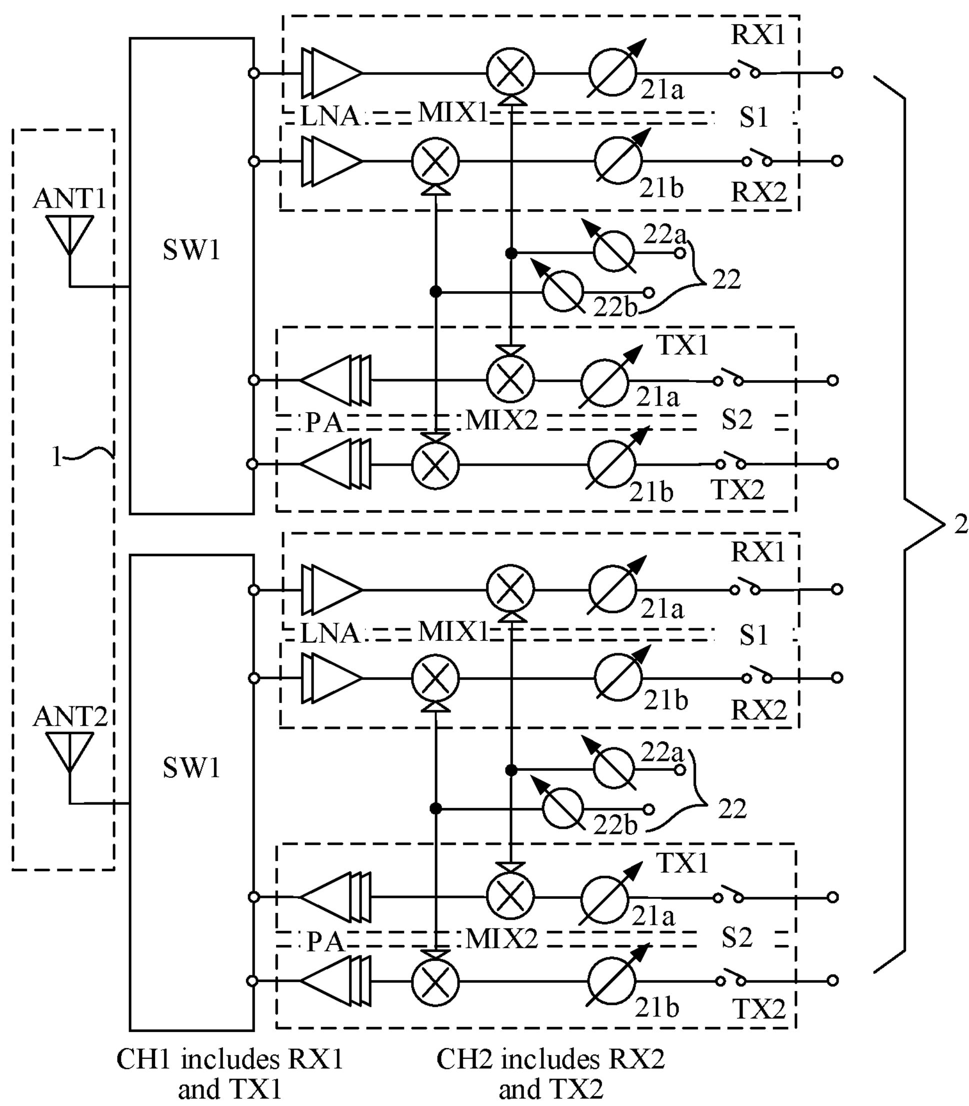
FIG. 5 is a schematic diagram of a structure of a third phased array apparatus according to an embodiment of this application.

In a possible embodiment, as shown in FIG. 5, the first transmission channel CH1 includes a first receive circuit RX1 and a first transmit circuit TX1, and each of the first receive circuit RX1 and the first transmit circuit TX1 includes one first intermediate frequency phase shifter 21*a*. The second transmission channel CH2 includes a second receive circuit RX2 and a second transmit circuit TX2, and each of the second receive circuit RX2 and the second transmit circuit TX2 includes one second intermediate frequency phase shifter 21*b*.

Specifically, for phase shift of a receive signal of the first frequency band, the first receive circuit RX1 may be configured to convert a receive radio frequency signal of the first frequency band into a first intermediate frequency signal through down-conversion processing, and the first intermediate frequency phase shifter 21*a* in the first receive circuit RX1 may be configured to perform phase shift processing on the first intermediate frequency signal, to implement phase shift of the receive signal of the first frequency band. For phase shift of a transmit signal of the first frequency band, the first intermediate frequency phase shifter 21*a* in the first transmit circuit TX1 may be configured to perform phase shift processing on the first intermediate frequency signal, and then a phase-shifted first intermediate frequency signal is converted into a radio frequency signal of the first frequency band by the first transmit circuit TX1 through up-conversion processing, to implement phase shift of the transmit signal of the first frequency band. For phase shift of a receive signal of the second frequency band, the second receive circuit RX2 may be configured to convert a receive radio frequency signal of the second frequency band into a second intermediate frequency signal through down-conversion processing, and then the second intermediate frequency phase shifter 21*b* in the second receive circuit RX2 performs phase shift processing on the second intermediate frequency signal, to implement phase shift of the receive signal of the second frequency band. For phase shift of a transmit signal of the second frequency band, the second intermediate frequency phase shifter 21*b* in the second transmit circuit TX2 may be configured to perform phase shift processing on the second intermediate frequency signal, and the second transmit circuit TX2 converts a phase-shifted second intermediate frequency signal into a radio frequency signal of the second frequency band through up-conversion processing, to implement phase shift of the transmit signal of the second frequency band.

Correspondingly, as shown in FIG. 5, each transmission channel of the first transmission channel CH1 and the second transmission channel CH2 in a same phased array channel includes an independent local oscillator phase shifter 22. For ease of distinguishing, herein, a local oscillator phase shifter 22 on the first transmission channel CH1 is represented as a first local oscillator phase shifter 22*a*, and a local oscillator phase shifter 22 on the second transmission channel CH2 is represented as a second local oscillator phase shifter 22*b*.

When the first transmission channel CH1 includes the first receive circuit RX1 and the first transmit circuit TX1, and the second transmission channel CH2 includes the second receive circuit RX2 and the second transmit circuit TX2, the first receive circuit RX1 and the first transmit circuit TX1 in a same phased array channel may share the first local oscillator phase shifter 22*a*, and the second receive circuit RX2 and the second transmit circuit TX2 may share the second local oscillator phase shifter 22*b*.

Specifically, for the first frequency band, the first local oscillator phase shifter 22*a* may be configured to set a phase of a first local oscillator signal. In this way, the first receive circuit RX1 may perform down-conversion processing on the radio frequency signal of the first frequency band by using a phase-set first local oscillator signal, to change a phase of the first intermediate frequency signal obtained through down-conversion processing. Then, the first intermediate frequency phase shifter 21*a* in the first receive circuit RX1 performs phase shift processing on the first intermediate frequency signal, that is, phase shift of the receive signal of the first frequency band is implemented. Similarly, the first local oscillator phase shifter 22*a* may be further configured to set the phase of the first local oscillator signal. In this way, the first transmit circuit TX1 may perform up-conversion processing by using the phase-set first local oscillator signal and the first intermediate frequency signal output by the first intermediate frequency phase shifter 21*a* through phase shift, to obtain a radio frequency signal of the first frequency band, that is, implement phase shift of a transmit signal of the first frequency band.

For the second frequency band, the second local oscillator phase shifter 22*b* may be configured to set a phase of a second local oscillator signal. In this way, the second receive circuit RX2 may perform down-conversion processing on the radio frequency signal of the second frequency band by using a phase-set second local oscillator signal, to change a phase of the second intermediate frequency signal obtained through down-conversion processing. Then, the second intermediate frequency phase shifter 21*b* in the second receive circuit RX2 performs phase shift processing on the second intermediate frequency signal, that is, phase shift of the receive signal of the second frequency band is implemented. Similarly, the second local oscillator phase shifter 22*b* may be further configured to set the phase of the second local oscillator signal. In this way, the second transmit circuit TX2 may perform up-conversion processing by using the phase-set second local oscillator signal and the second intermediate frequency signal output by the second intermediate frequency phase shifter 21*b* through phase shift, to obtain a radio frequency signal of the second frequency band, that is, phase shift of a transmit signal of the second frequency band is implemented.

In an example, as shown in FIG. 5, the first receive circuit RX1 and the second receive circuit RX2 each may further include an LNA, a down-converter MIX1, and a first switch S1 that are coupled in sequence, and the first transmit circuit and the second transmit circuit each may further include a PA, an up-converter MIX2, and a second switch S2 that are coupled in sequence. The up-converter may be an up mixer, and the down-converter may be a down mixer. In FIG. 5, an example in which MIX1 represents the down mixer and MIX2 represents the up mixer is used for description.

Optionally, when the at least two frequency bands further include a third frequency band, each phased array channel 2 in the plurality of phased array channels 2 may further include a third transmission channel CH3 corresponding to the third frequency band, the third transmission channel CH3 may include a third receive circuit RX3 and a third transmit circuit TX3, and the third receive circuit RX3 and the third transmit circuit TX3 in a same phased array channel may also include an independent intermediate frequency phase shifter 21 and a local oscillator phase shifter 22. A specific structure of the third transmission channel CH3 is similar to specific structures of the first transmission channel CH1 and the second transmission channel CH2, and details are not described herein again in this embodiment of this application.

In the foregoing second manner, each phased array channel 2 in the plurality of phased array channels 2 may implement complete phase shift of a receive signal and a transmit signal of the first frequency band by using the first intermediate frequency phase shifter 21*a* and the first local oscillator phase shifter 22*a*, and complete phase shift of a receive signal and a transmit signal of the second frequency band by using the second intermediate frequency phase shifter 21*b* and the second local oscillator phase shifter 22*b*. In this way, a stage quantity of the phase shifters can be greatly reduced, thereby reducing an insertion loss and increasing a signal gain in the phased array channel.

Figure 6:
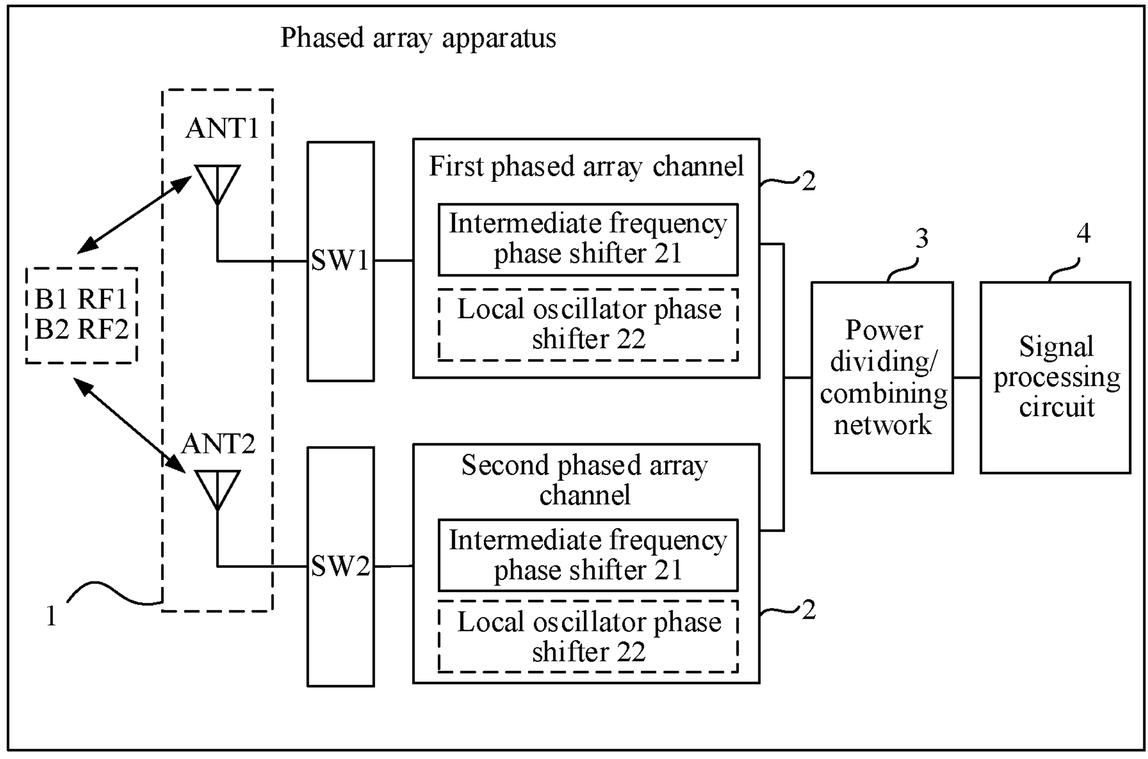
FIG. 6 is a schematic diagram of a structure of a fourth phased array apparatus according to an embodiment of this application.

Further, with reference to FIG. 3, as shown in FIG. 6, the apparatus may further include a power dividing/combining network 3 and a signal processing circuit 4. When phase shift manners of signals transmitted on the plurality of phased array channels 2 are different, structures of the power dividing/combining network 3 and the signal processing circuit 4 and coupling manners with the plurality of phased array channels 2 are also different. The following separately describes in detail specific structures of the power dividing/combining network 3 and the signal processing circuit 4 in the foregoing two phase shift manners and coupling manners with the plurality of phased array channels 2.

In the first manner, the power dividing/combining network 3 may include a first power dividing/combining network 31 and a second power dividing/combining network 32, and the signal processing circuit 4 may include a receive signal processing circuit 41 coupled to the first power dividing/combining network 31 and a transmit signal processing circuit 42 coupled to the second power dividing/combining network 32.

Figure 7:
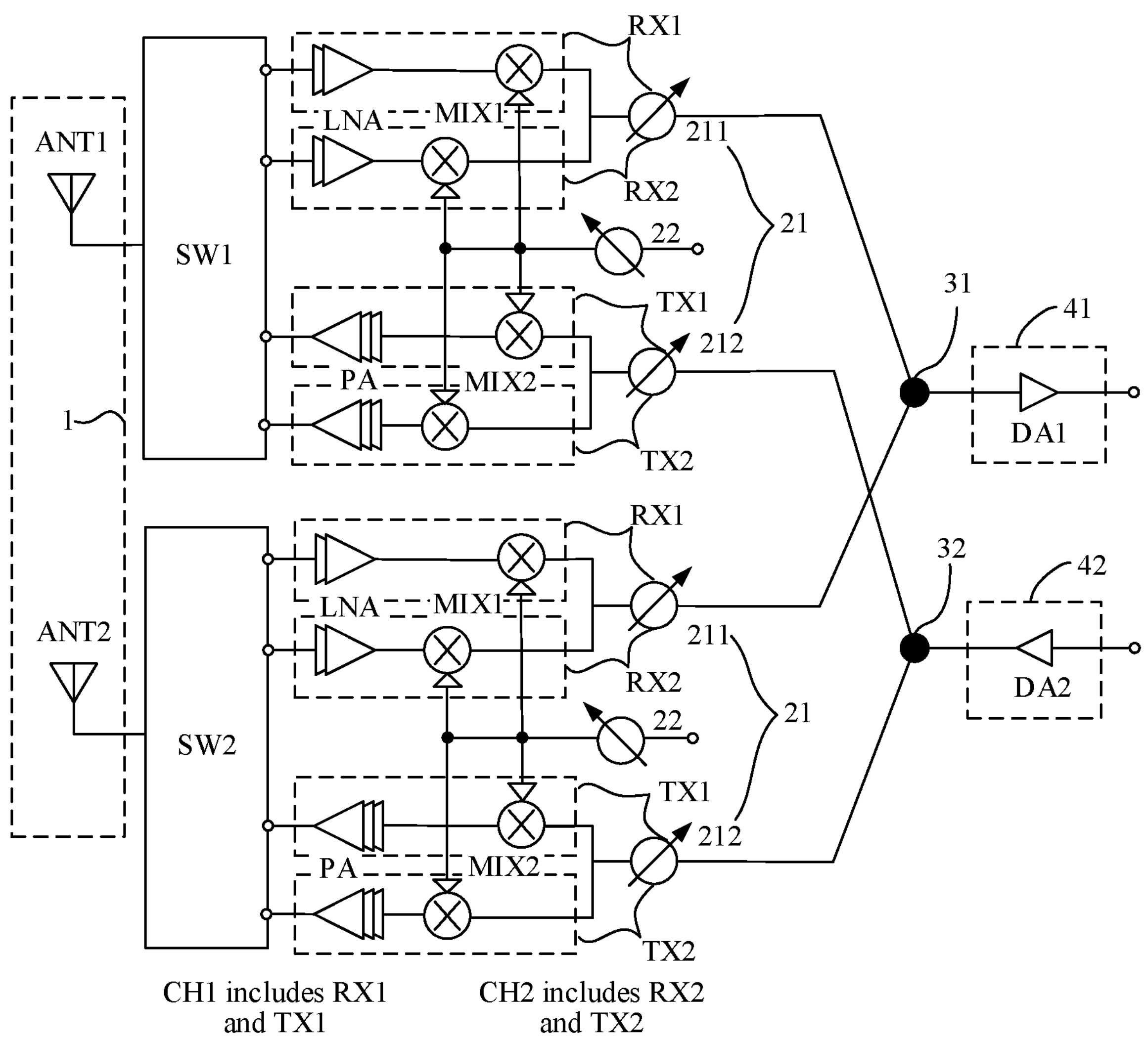
FIG. 7 is a schematic diagram of a structure of a fifth phased array apparatus according to an embodiment of this application.

For example, as shown in FIG. 7, both the first receive circuit RX1 and the second receive circuit RX2 in the plurality of phased array channels 2 may be coupled to the first power dividing/combining network 31, both the first transmit circuit TX1 and the second transmit circuit TX2 in the plurality of phased array channels 2 may be coupled to the second power dividing/combining network 32, the first power dividing/combining network 31 may be coupled to the receive signal processing circuit 41, and the second power dividing/combining network 32 may be coupled to the transmit signal processing circuit 42.

The first power dividing/combining network 31 may be specifically a combiner, and the combiner is configured to combine a plurality of signals into one signal. The second power dividing/combining network 32 may be specifically a power splitter, and the power splitter may be configured to divide one signal into a plurality of signals. The receive signal processing circuit 41 may specifically include a first drive amplifier (DA), a first low pass filter (LPF), an analog-to-digital converter (ADC), and the like. The transmit signal processing circuit 42 may specifically include a second DA, a second LPF, a digital-to-analog converter (DAC), and the like. FIG. 7 shows only the first DA and the second DA, and the first DA is represented as DA1 and the second DA is represented as DA2.

Specifically, the first power dividing/combining network 31 may be configured to perform combining processing on a plurality of receive signals that are of the first frequency band or the second frequency band and that are output by the plurality of phased array channels 2, and transmit one signal obtained through combination to the receive signal processing circuit 41. The receive signal processing circuit 41 performs a series of processing such as amplification and filtering on the signal. The transmit signal processing circuit 42 may be configured to perform a series of processing such as amplification and filtering on a transmit signal corresponding to the first frequency band or the second frequency band, and transmit a processed signal to the second power dividing/combining network 32. The second power dividing/combining network 32 divides the signal into a plurality of signals through power dividing processing, and separately transmits the plurality of signals to the plurality of phased array channels 2.

Figure 8:
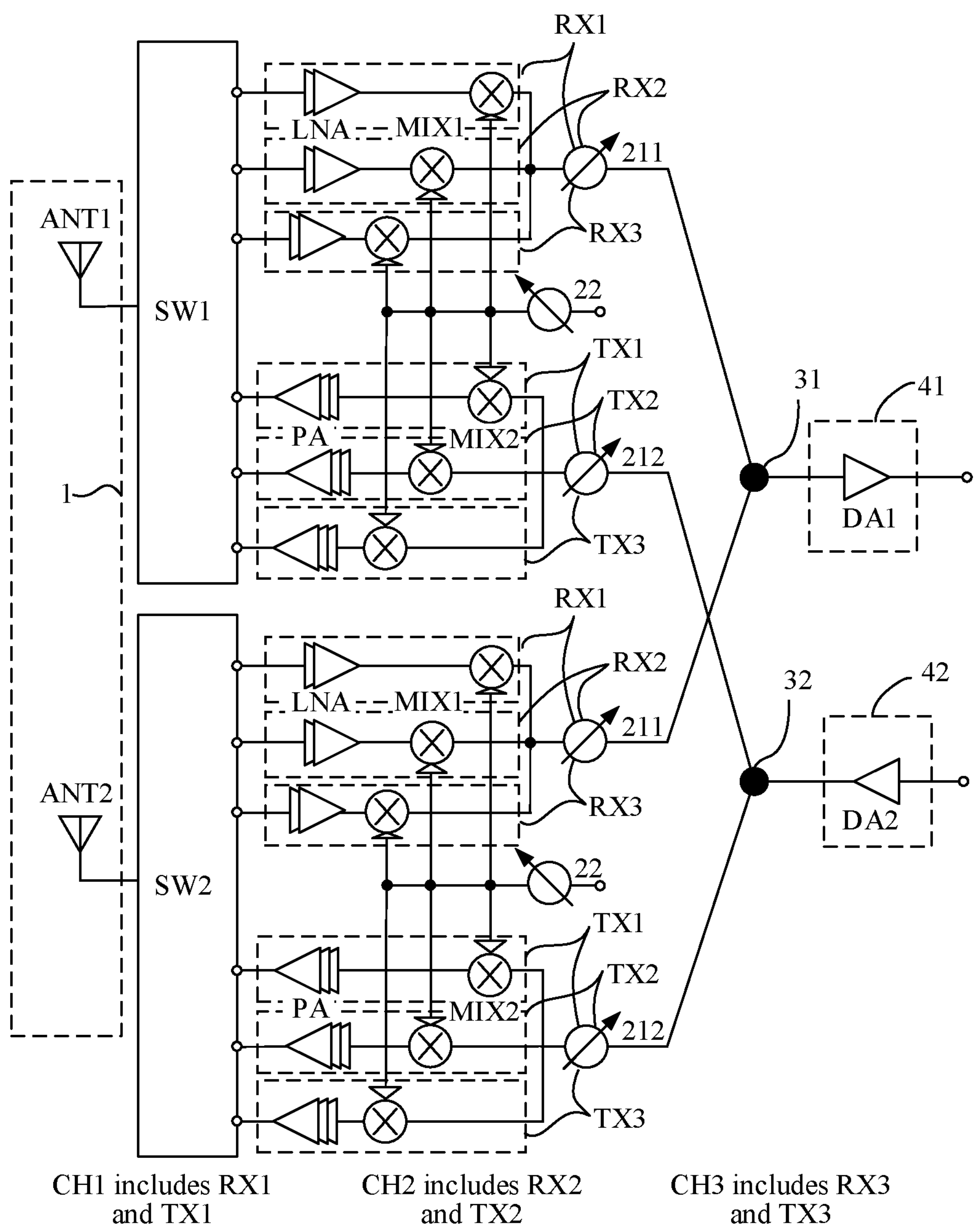
FIG. 8 is a schematic diagram of a structure of a sixth phased array apparatus according to an embodiment of this application.

Optionally, as shown in FIG. 8, when each phased array channel 2 in the plurality of phased array channels 2 further includes a third transmission channel CH3 corresponding to a third frequency band, a third receive circuit RX3 on the third transmission channel CH3 may also be coupled to the first power dividing/combining network 31, and a third transmit circuit TX3 may also be coupled to the second power dividing/combining network 32. Processing on a receive signal and a transmit signal of the third frequency band by the first power dividing/combining network 31, the second power dividing/combining network 32, the receive signal processing circuit 41, and the transmit signal processing circuit 42 is similar to processing of the receive signal and the transmit signal of the first frequency band and the second frequency band. Details are not described herein again in this embodiment of this application.

In the foregoing manner, when receive circuits of different frequency bands in the plurality of phased array channels share the first power dividing/combining network 31 and the receive signal processing circuit 41, and transmit circuits of different frequency bands share the second power dividing/combining network 32 and the transmit signal processing circuit 42, an area of the phased array apparatus may be further reduced, thereby reducing a size of a device in which the phased array apparatus is used.

In the foregoing second manner, the power dividing/combining network 3 may include a first power dividing/combining network 31 and a second power dividing/combining network 32, and the signal processing circuit 4 includes a first signal processing circuit 41 corresponding to the first frequency band and a second signal processing circuit 42 corresponding to the second frequency band. The first signal processing circuit 41 includes a first receive signal processing circuit and a first transmit signal processing circuit, which are respectively configured to process a receive signal and a transmit signal of the first frequency band. The second signal processing circuit 42 includes a second receive signal processing circuit and a second signal processing circuit, which are respectively configured to process a receive signal and a transmit signal of the second frequency band.

Figure 9:
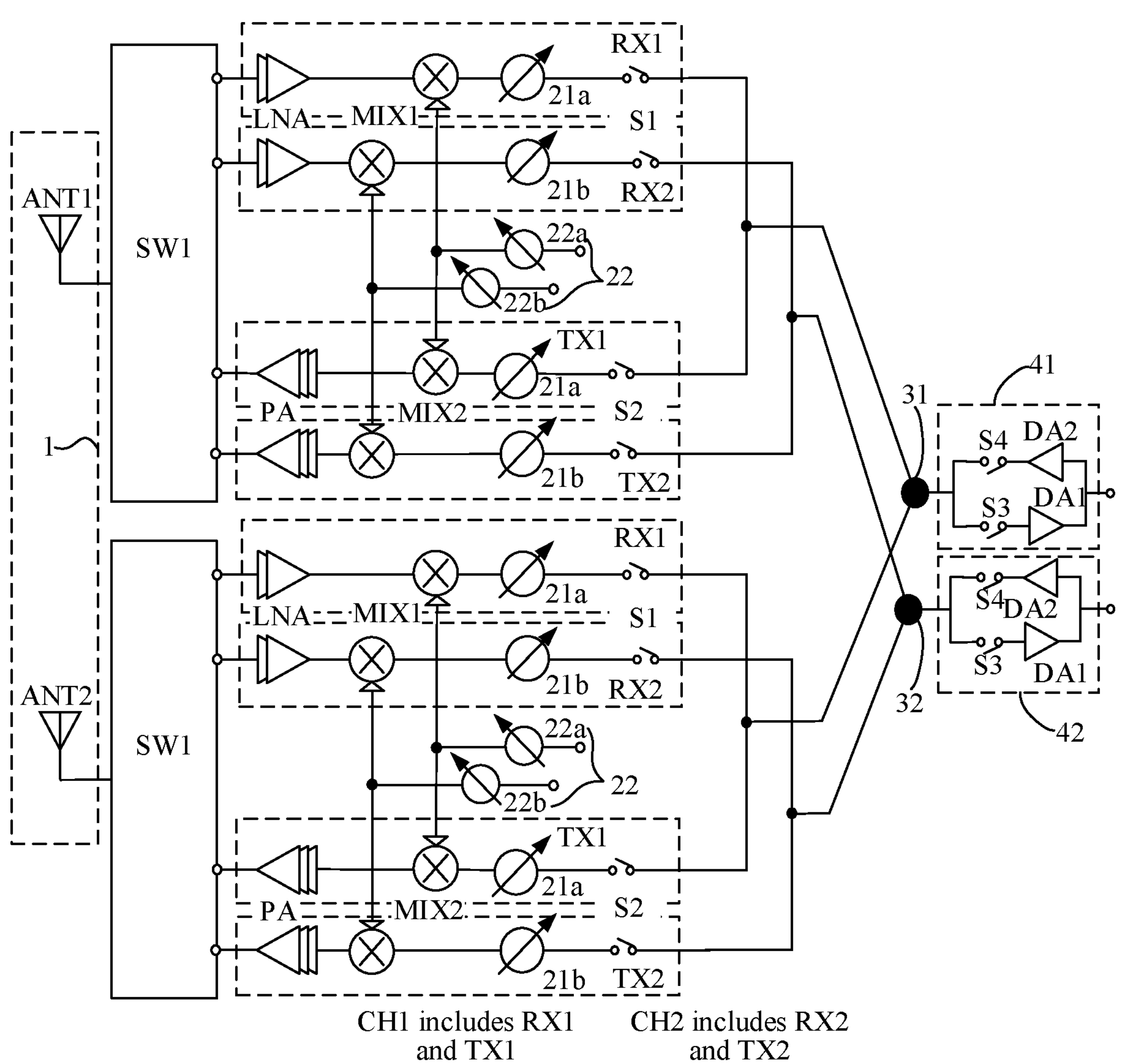
FIG. 9 is a schematic diagram of a structure of a seventh phased array apparatus according to an embodiment of this application.

For example, as shown in FIG. 9, both the first receive circuit RX1 and the first transmit circuit TX1 in the plurality of phased array channels 2 may be coupled to the first power dividing/combining network 31, both the second receive circuit RX2 and the second transmit circuit TX2 in the plurality of phased array channels 2 may be coupled to the second power dividing/combining network 32, the first power dividing/combining network 31 may be coupled to the first signal processing circuit 41, and the second power dividing/combining network 32 may be coupled to the second signal processing circuit 42.

The first power dividing/combining network 31 and the second power dividing/combining network 32 each may include a combiner and a power splitter. The combiner is configured to combine a plurality of signals into one signal, and the power splitter may be configured to divide one signal into a plurality of signals. The first receive signal processing circuit and the second receive signal processing circuit each may specifically include a third switch S3, a first drive amplifier (DA), a first low pass filter (LPF), an analog-to-digital converter (ADC), and the like. The first transmit signal processing circuit and the second transmit signal processing circuit each may specifically include a fourth switch S4, a second DA, a second LPF, a digital-to-analog converter (DAC), and the like. FIG. 9 shows only the third switch S3, the first DA, the fourth switch S4, and the second DA, and the first DA is represented as DA1 and the second DA is represented as DA2.

Specifically, the first power dividing/combining network 31 may be configured to perform combining processing on receive signals corresponding to the first frequency band, and transmit a combined signal to the first signal processing circuit 41, or perform power dividing processing on a transmit signal that corresponds to the first frequency band and is transmitted by the first signal processing circuit 41, and then transmit a processed signal to the plurality of phased array channels 2. The first signal processing circuit 41 may be configured to perform, by using a first signal receive signal, a series of processing such as amplification and filtering on the receive signals that correspond to the first frequency band and are transmitted by the first power dividing/combining network 31, or perform, by using a first transmit signal processing circuit, a series of processing such as amplification and filtering on the transmit signal corresponding to the first frequency band, and then transmit a processed signal to the first power dividing/combining network 31. The second power dividing/combining network 32 may be configured to perform combining processing on receive signals corresponding to the second frequency band, and transmit a combined signal to the second signal processing circuit 42, or perform power dividing processing on a transmit signal that corresponds to the second frequency band and is transmitted by the second signal processing circuit 42, and then transmit a processed signal to the plurality of phased array channels 2. The second signal processing circuit 42 may be configured to perform, by using a second signal receive signal, a series of processing such as amplification and filtering on the receive signals that correspond to the second frequency band and are transmitted by the second power dividing/combining network 32, or perform, by using a second transmit signal processing circuit, a series of processing such as amplification and filtering on the transmit signal corresponding to the second frequency band, and then transmit a processed signal to the second power dividing/combining network 32.

Figure 10:
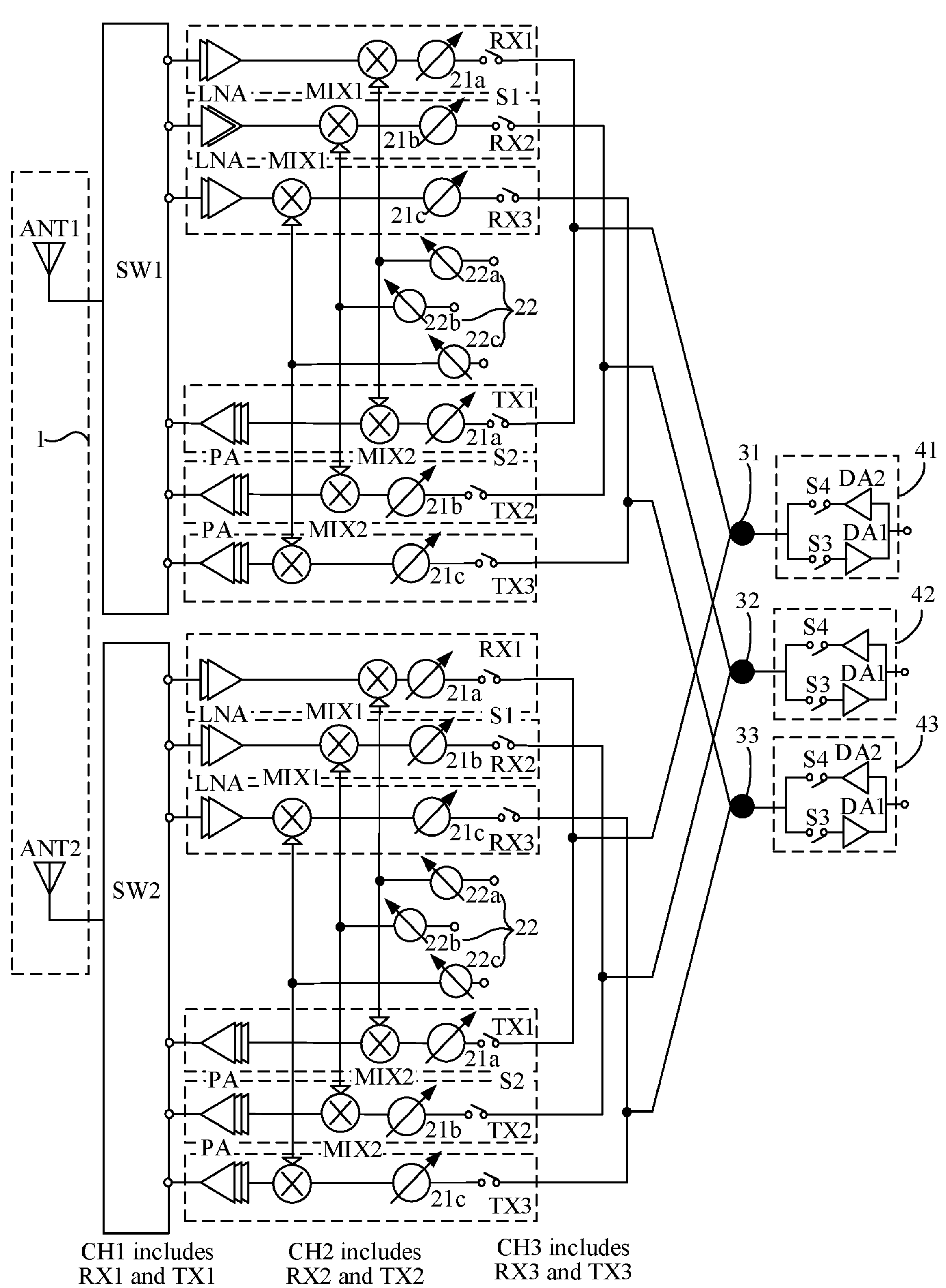
FIG. 10 is a schematic diagram of a structure of an eighth phased array apparatus according to an embodiment of this application.

Optionally, as shown in FIG. 10, when each phased array channel 2 in the plurality of phased array channels 2 further includes a third transmission channel CH3 corresponding to a third frequency band, the power dividing/combining network 3 may further include a third power dividing/combining network 33, the signal processing circuit 4 may further include a third signal processing circuit 43, and a third receive circuit RX3 and a third transmit circuit TX3 in the third transmission channel CH3 may be coupled to the third power dividing/combining network 33. The third power dividing/combining network 33 may be coupled to the third signal processing circuit 43. Processing performed by the third power dividing/combining network 33 and the third signal processing circuit 43 on a receive signal and a transmit signal of the third frequency band is similar to processing performed on the receive signal and the transmit signal of the foregoing first frequency band and the second frequency band, and details are not described herein again in this embodiment of this application. In FIG. 10, an intermediate frequency phase shifter 21 included in the third transmission channel CH3 is represented as a third intermediate frequency phase shifter 21*c*, and a local oscillator phase shifter 22 included in the third transmission channel CH3 is represented as a third local oscillator phase shifter 22*c*.

In the foregoing manner, when the receive circuit and the transmit circuit of each frequency band in the plurality of phased array channels correspond to one power dividing/combining network and one receive signal processing circuit, different processing may be implemented on receive signals and transmit signals of different frequency bands, thereby improving flexibility of processing signals of different frequency bands by the phased array apparatus.

Further, an embodiment of this application further provides a local oscillator phase shifter. The local oscillator phase shifter may be used in any one of the foregoing phased array channels. The local oscillator phase shifter may include: a local oscillator signal generator, configured to generate a first in-phase local oscillator signal and a first quadrature local oscillator signal, where the first in-phase local oscillator signal and the first quadrature local oscillator signal are voltage signals; a first transconductance stage and a second transconductance stage, configured to respectively convert the first in-phase local oscillator signal and the first quadrature local oscillator signal into a second in-phase local oscillator signal and a second quadrature local oscillator signal, where the second in-phase local oscillator signal and the second quadrature local oscillator signal are current signals; and a first tunable current source and a second tunable current source, configured to respectively adjust the second in-phase local oscillator signal and the second quadrature local oscillator signal, to adjust a phase of a local oscillator signal obtained through combining the second in-phase local oscillator signal and the second quadrature local oscillator signal. An adjustment function of the first tunable current source and the second tunable current source may be implemented by adjusting a size of the first tunable current source and a size of the second tunable current source, or may be implemented by setting a bias voltage for the first tunable current source and the second tunable current source and adjusting the bias voltage.

In another possible example, the local oscillator phase shifter may further include a selection circuit, where the selection circuit includes: a first selection circuit configured to provide the local oscillator signal for a first branch, and a second selection circuit configured to provide the local oscillator signal for a second branch. The first branch herein may be a transmit circuit, and the second branch may be a receive circuit. For example, the transmit circuit and the receive circuit are respectively a first transmit circuit TX1 and a first receive circuit RX1, or the transmit circuit and the receive circuit are respectively a second transmit circuit TX2 and a second receive circuit RX2. The selection circuit is specifically configured to provide the local oscillator signal for a mixer MIX included in the transmit circuit or the receive circuit.

Optionally, each selection circuit of the first selection circuit and the second selection circuit may include two MOS transistors, gates of the two MOS transistors each are configured to receive a switch signal, drains of the two MOS transistors are used as output ends, a source of one of the MOS transistors is coupled to an output end of the first transconductance stage, and a source of the other MOS transistor is coupled to an output end of the second transconductance stage.

In still another possible example, the local oscillator signal obtained through combining the second in-phase local oscillator signal and the second quadrature local oscillator signal is a current signal, and the local oscillator phase shifter may further include a conversion circuit, configured to convert the local oscillator signal into a voltage signal. For example, the conversion circuit may include a transformer configured to convert a current signal into a voltage signal.

Specifically, the local oscillator phase shifter may be referred to as a 3-bit (bits) phase shifter. The local oscillator signal generator may be configured to generate a first in-phase local oscillator signal VIN_I and a first quadrature local oscillator signal VIN_Q. For example, the first in-phase local oscillator signal VIN_I may be a first in-phase differential local oscillator signal and is represented as VIN_I+ and VIN_I−, and the first quadrature local oscillator signal VIN_Q may be a first quadrature differential local oscillator signal and is represented as VIN_Q+ and VIN_Q−.

Figure 11:
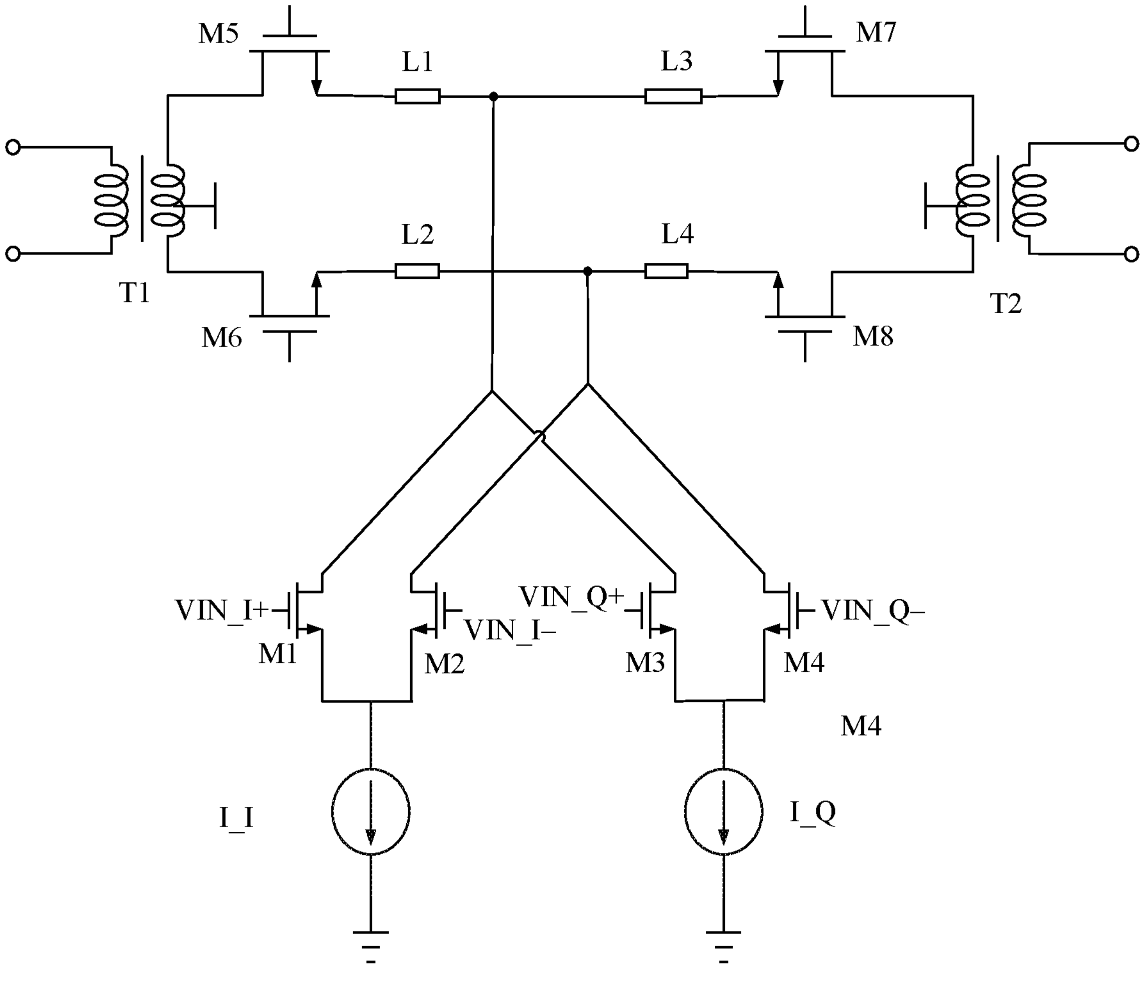
FIG. 11 is a schematic diagram of a structure of a local oscillator phase shifter according to an embodiment of this application.

In addition, FIG. 11 is a schematic diagram of a structure of a local oscillator phase shifter according to an embodiment of this application. A local oscillator signal generator is not shown in the local oscillator phase shifter. In the local oscillator phase shifter, a first tunable current source and a second tunable current source may be represented as I_I and I_Q respectively; a first transconductance stage may include a first MOS transistor M1 and a second MOS transistor M2; a second transconductance stage may include a third MOS transistor M3 and a fourth MOS transistor M4; a first selection circuit may include a fifth MOS transistor M5 and a sixth MOS transistor M6; a second selection circuit may include a seventh MOS transistor M7 and an eighth MOS transistor M8; and a conversion circuit may include a first transformer T1 and a second transformer T2. Specifically, one end of the first tunable current source I_I is grounded, and the other end is coupled to a source of the first MOS transistor M1 and a source of the second MOS transistor M2; one end of the second tunable current source I_Q is grounded, and the other end is coupled to a source of the third MOS transistor M3 and a source of the fourth MOS transistor M4; a drain of the first MOS transistor M1 and a drain of the third MOS transistor M3 each are coupled to a first node; a drain of the second MOS transistor M2 and a drain of the fourth MOS transistor M4 each are coupled to a second node; a drain of the fifth MOS transistor M5 and a drain of the sixth MOS transistor M6 are respectively coupled to two first ends of the first transformer, a source of the fifth MOS transistor M5 is coupled to the first node, a source of the sixth MOS transistor M6 is coupled to the second node, and two second ends of the first transformer are configured to output local oscillator signals for frequency conversion processing performed on transmit signals; and a drain of the seventh MOS transistor M7 and a drain of the eighth MOS transistor M8 are respectively coupled to two first ends of the second transformer, a source of the seventh MOS transistor M7 is coupled to the first node, a source of the eighth MOS transistor M8 is coupled to the second node, and two second ends of the second transformer are configured to output local oscillator signals for frequency conversion processing performed on receive signals. A gate of the first MOS transistor M1 and a gate of the second MOS transistor M2 are configured to receive VIN_I+ and VIN_I−, a gate of the third MOS transistor M3 and a gate of the fourth MOS transistor M4 are configured to receive VIN_Q+ and VIN_Q−, and gates of the fifth MOS transistor M5 to the eighth MOS transistor M8 are configured to receive switch signals.

Optionally, the source of the fifth MOS transistor M5 may be connected to the first node through a first transmission line L1, the source of the sixth MOS transistor M6 may be connected to the second node through a second transmission line L2, the source of the seventh MOS transistor M7 may be connected to the first node through a third transmission line L3, and the source of the eighth MOS transistor M8 may be connected to the second node through a fourth transmission line L4. In actual application, the first transmission line L1 to the fourth transmission line L4 may be implemented through metal wires on a chip on which the phased array apparatus is located.

Specifically, for the phased array apparatus that uses the local oscillator phase shifter, if phase shift needs to be performed on a receive signal, the seventh MOS transistor M7 and the eighth MOS transistor M8 are controlled to be turned on; and if phase shift needs to be performed on a transmit signal, the fifth MOS transistor M5 and the sixth MOS transistor M6 are controlled to be turned on. If phase shift at different angles needs to be implemented, the first tunable current source I_I and the second tunable current source I_Q may be controlled to be turned on or off. For example, if the first tunable current source I_I is controlled to be turned on (that is, the VIN_I branch is turned on) and the second tunable current source I_Q is controlled to be turned off (that is, the VIN_Q branch is turned off), a local oscillator signal output by the local oscillator phase shifter is in-phase with the VIN_I branch, so that phase shift of 0° may be implemented; if the first tunable current source I_I and the second tunable current source I_Q are controlled to be turned off (that is, the VIN_I branch is turned off), if the second tunable current source I_Q is controlled to be turned on (that is, the VIN_Q branch is turned on), a local oscillator signal output by the local oscillator phase shifter is in-phase with the VIN_Q branch, so that phase shift of 90° may be implemented; and if both the first tunable current source I_I and the second tunable current source I_Q are controlled to be turned on (that is, both the VIN_I branch and the VIN_Q branch are turned on), and signal amplitudes of the VIN_I branch and the VIN_Q branch are equal, in this case, a difference between a local oscillator signal output by the local oscillator phase shifter and the VIN_I branch is 45°, so that phase shift of 45° may be implemented. Optionally, signal amplitudes of the first tunable current source I_I and the second tunable current source I_Q are adjustable.

It should be noted that a structure of the local oscillator phase shifter is merely an example, and the foregoing control processes of implementing 0°, 90°, and 45° phase shift are also merely examples, and do not constitute a limitation on this embodiment of this application. If higher-precision local oscillator phase shift needs to be implemented, the local oscillator phase shifter may further include more MOS transistors. This is not specifically limited in this embodiment of this application. In addition, the MOS transistor in the local oscillator phase shifter may be a PMOS transistor or an NMOS transistor. In FIG. 11, only the PMOS transistor is used as an example for description.

In addition, in the foregoing description of the structure of the local oscillator phase shifter, only an example in which the MOS transistor is a PMOS transistor is used for description. The foregoing MOS transistor may also be an NMOS transistor, or may include both an NMOS transistor and a PMOS transistor, or may be another MOS transistor having a same function. FIG. 11 does not constitute a limitation on this embodiment of this application, and this is not specifically limited in this embodiment of this application.

In another embodiment of this application, a chip module is further provided. The chip module includes a chip and a package substrate. The chip includes any one of the foregoing phased array channels. The package substrate may include the antenna array that is provided above and has a plurality of antenna units. The plurality of antenna units are coupled to a plurality of phased array channels in the phased array apparatus.

Figure 12:
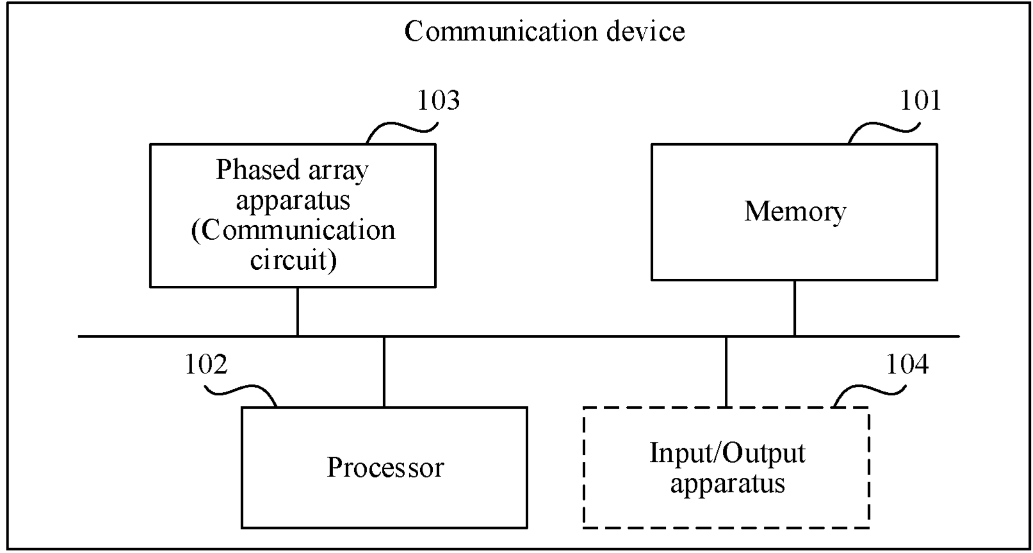
FIG. 12 is a schematic diagram of a structure of a communication device according to an embodiment of this application.

As shown in FIG. 12, an embodiment of this application further provides a communication device. The communication device includes a memory 101, a processor 102, and a phased array apparatus 103 provided above.

It should be understood that the communication device may be specifically a terminal device such as a smartphone, a computer, or a smartwatch. When the terminal device is a smartphone, the phased array apparatus 103 may also be referred to as a communication circuit, and the terminal device may further include an input/output apparatus 104. The processor 102 is mainly configured to process a communication protocol and communication data, control the entire smartphone, execute a software program, and process data of the software program. The memory 101 is mainly configured to store the software program and data. The phased array apparatus 103 is mainly configured to perform conversion between a baseband signal and a radio frequency signal, process the radio frequency signal, receive and send a radio frequency signal in an electromagnetic wave form, and the like. The input/output apparatus, for example, a touchscreen, a display screen, or a keyboard, is mainly configured to receive data input by a user and output data to the user.

After the foregoing smartphone is powered on, the processor 102 may read a software program of the memory 101, interpret and execute instructions of the software program, and process data of the software program. When data needs to be sent wirelessly, the processor 102 performs baseband processing on the data to be sent, and then outputs a baseband signal to the phased array apparatus 103. The phased array apparatus 103 performs radio frequency processing on the baseband signal, and then sends out a processed radio frequency signal in an electromagnetic wave form through an antenna. When data is sent to the smartphone, the phased array apparatus 103 receives a radio frequency signal through the antenna, converts the radio frequency signal into a baseband signal, and outputs the baseband signal to the processor 102. The processor 102 converts the baseband signal into data and processes the data.

A person skilled in the art may understand that for ease of description, FIG. 12 shows only one memory and one processor. In an actual terminal device, there may be a plurality of processors and a plurality of memories. The memory may also be referred to as a storage medium, a storage device, or the like. It should be noted that a type of the memory is not limited in this embodiment of this application.

It should be understood that an $X^{th}$ frequency band mentioned in this embodiment of this application, for example, the first frequency band or the second frequency band, is a fixed frequency range defined by a standardization organization or commercially used, and includes but is not limited to a millimeter-wave frequency band of 5G defined by 3GPP in embodiments of this application, for example, n257 (26.5 GHz to 29.500 GHz), n260 (37 GHz to 40 GHz), n258 (24.25 GHz to 27.5 GHz), or n261 (27.5 GHz to 28.35 GHz).

It should be understood that a signal of the $X^{th}$ frequency band mentioned in this embodiment of this application, for example, a signal of the first frequency band or a signal of the second frequency band, is a signal transmitted in the $X^{th}$ frequency band. The signal may be a signal transmitted using an entire bandwidth or a partial bandwidth in the $X^{th}$ frequency band. For example, signals of a corresponding n257 frequency band include but are not limited to a signal 1 whose frequency range is 26.5 G to 27 G, a signal 2 whose frequency range is 27 G to 28 G, a signal 3 whose frequency range is 27 G to 29.5 G, and a signal 4 whose frequency range is 26.5 G to 29.5 G.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A phased array apparatus comprising:

a plurality of phased array channels coupled to a plurality of antenna units in an antenna array in a one-to-one manner, wherein each of the phased array channels is configured to transmit radio frequency signals of at least two frequency bands through a same antenna unit of the plurality of antenna units; and each of the phased array channels comprises an intermediate frequency phase shifter configured to set a phase of an intermediate frequency signal corresponding to a radio frequency signal transmitted on the phased array channel.

2. The phased array apparatus according to claim 1, wherein each of the phased array channels further comprises a local oscillator phase shifter configured to set a phase of a local oscillator signal transmitted on the phased array channel.

3. The phased array apparatus according to claim 1, wherein the at least two frequency bands comprise a first frequency band and a second frequency band, each of the phased array channels comprises a first transmission channel corresponding to the first frequency band and a second transmission channel corresponding to the second frequency band, and the first transmission channel and the second transmission channel in a same phased array channel share the intermediate frequency phase shifter.

4. The phased array apparatus according to claim 3, wherein each of the phased array channels further comprises a local oscillator phase shifter configured to set a phase of a local oscillator signal transmitted on the phased array channel, and wherein the first transmission channel and the second transmission channel in the same phased array channel share the local oscillator phase shifter.

5. The phased array apparatus according to claim 3, wherein the intermediate frequency phase shifter comprises a first intermediate frequency phase shifter; and the first transmission channel comprises a first receive circuit, the second transmission channel comprises a second receive circuit, and the first receive circuit and the second receive circuit share the first intermediate frequency phase shifter.

6. The phased array apparatus according to claim 5, wherein the intermediate frequency phase shifter further comprises a second intermediate frequency phase shifter; and the first transmission channel further comprises a first transmit circuit, the second transmission channel further comprises a second transmit circuit, and the first transmit circuit and the second transmit circuit share the second intermediate frequency phase shifter.

7. The phased array apparatus according to claim 6, wherein the first receive circuit, the first transmit circuit, the second receive circuit, and the second transmit circuit in the same phased array channel further share the same local oscillator phase shifter.

8. The phased array apparatus according to claim 6, wherein each of the first receive circuit and the second receive circuit further comprises a low noise amplifier (LNA) and a down-converter that are coupled in sequence, and each of the first transmit circuit and the second transmit circuit further comprises a power amplifier (PA) and an up-converter that are coupled in sequence.

9. The phased array apparatus according to claim 6 further comprising a first power dividing/combining network and a second power dividing/combining network, wherein both the first receive circuit and the second receive circuit in the plurality of phased array channels are coupled to the first power dividing/combining network, and both the first transmit circuit and the second transmit circuit in the plurality of phased array channels are coupled to the second power dividing/combining network.

10. The phased array apparatus according to claim 9, further comprising a receive signal processing circuit and a transmit signal processing circuit, wherein the first power dividing/combining network is coupled to the receive signal processing circuit, and the second power dividing/combining network is coupled to the transmit signal processing circuit.

11. The phased array apparatus according to claim 1, wherein the at least two frequency bands comprise a first frequency band and a second frequency band, each of the phased array channels comprises a first transmission channel corresponding to the first frequency band and a second transmission channel corresponding to the second frequency band, and each of the first transmission channel and the second transmission channel in a same phased array channel comprises an independent intermediate frequency phase shifter.

12. The phased array apparatus according to claim 11, wherein each of the first transmission channel and the second transmission channel in the same phased array channel comprises an independent local oscillator phase shifter.

13. The phased array apparatus according to claim 11, wherein:

the intermediate frequency phase shifter comprises a first intermediate frequency phase shifter and a second intermediate frequency phase shifter;

the first transmission channel comprises a first receive circuit, and the first receive circuit comprises the first intermediate frequency phase shifter; and the second transmission channel comprises a second receive circuit, and the second receive circuit comprises the second intermediate frequency phase shifter.

14. The phased array apparatus according to claim 11, wherein:

the intermediate frequency phase shifter further comprises a first intermediate frequency phase shifter and a second intermediate frequency phase shifter;

the first transmission channel further comprises a first transmit circuit, and the first transmit circuit comprises the first intermediate frequency phase shifter; and the second transmission channel comprises a second transmit circuit, and the second transmit circuit comprises the second intermediate frequency phase shifter.

15. The phased array apparatus according to claim 14, wherein:

the local oscillator phase shifter comprises a first local oscillator phase shifter and a second local oscillator phase shifter, a first receive circuit and a first transmit circuit in a same phased array channel share the first local oscillator phase shifter, and a second receive circuit and a second transmit circuit in a same phased array channel share the second local oscillator phase shifter.

16. The phased array apparatus according to claim 14, wherein:

each of the first receive circuit and the second receive circuit further comprises a low noise amplifier (LNA), a down-converter, and a first switch that are coupled in sequence, and each of the first transmit circuit and the second transmit circuit further comprises a power amplifier (PA), an up-converter, and a second switch that are coupled in sequence.

17. The phased array apparatus according to claim 14 further comprising a first power dividing/combining network and a second power dividing/combining network, wherein both the first receive circuit and the first transmit circuit in the plurality of phased array channels are coupled to the first power dividing/combining network, and both the second receive circuit and the second transmit circuit in the plurality of phased array channels are coupled to the second power dividing/combining network.

18. The phased array apparatus according to claim 17 further comprising a first signal processing circuit coupled to the first power dividing/combining network, and a second signal processing circuit coupled to the second power dividing/combining network;

wherein the first signal processing circuit comprises a first send signal processing circuit and a first receive signal processing circuit, and the second signal processing circuit comprises a second send signal processing circuit and a second receive signal processing circuit.

19. The phased array apparatus according to claim 1 further comprising:

a plurality of switching switches coupled between the plurality of antenna units and the plurality of phased array channels in a one-to-one correspondence.

20. A communication device, wherein the communication device comprises a phased array apparatus comprising:

a plurality of phased array channels coupled to a plurality of antenna units in an antenna array in a one-to-one manner, wherein each of the phased array channels is configured to transmit radio frequency signals of at least two frequency bands through a same antenna unit of the plurality of antenna units; and each of the phased array channels comprises an intermediate frequency phase shifter configured to set a phase of an intermediate frequency signal corresponding to a radio frequency signal transmitted on the phased array channel.

* * * * *